(12) United States Patent
Hosek et al.

(10) Patent No.: US 12,083,666 B2
(45) Date of Patent: Sep. 10, 2024

(54) TRAVERSING ROBOT WITH MULTIPLE END EFFECTORS

(71) Applicant: Persimmon Technologies Corporation, Wakefield, MA (US)

(72) Inventors: Martin Hosek, Salem, MA (US); Scott Wilkas, Lexington, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 49 days.

(21) Appl. No.: 18/102,227

(22) Filed: Jan. 27, 2023

(65) Prior Publication Data
US 2023/0234238 A1 Jul. 27, 2023

Related U.S. Application Data

(60) Provisional application No. 63/303,682, filed on Jan. 27, 2022.

(51) Int. Cl.
| | | |
|---|---|---|
| *B25J 11/00* | (2006.01) | |
| *B25J 9/00* | (2006.01) | |
| *B25J 9/10* | (2006.01) | |
| *B25J 9/16* | (2006.01) | |

(52) U.S. Cl.
CPC ......... *B25J 11/0095* (2013.01); *B25J 9/0027* (2013.01); *B25J 9/0084* (2013.01); *B25J 9/0096* (2013.01); *B25J 9/106* (2013.01); *B25J 9/1641* (2013.01); *B25J 9/1664* (2013.01)

(58) Field of Classification Search
CPC ...... B25J 9/0027; B25J 9/0084; B25J 9/0096; B25J 9/106; B25J 9/1641; B25J 9/1664; B25J 11/0095
See application file for complete search history.

(56) References Cited

U.S. PATENT DOCUMENTS

| | | | | |
|---|---|---|---|---|
| 6,440,178 B2* | 8/2002 | Berner | ...................... | C25D 7/12 414/941 |
| 6,481,956 B1* | 11/2002 | Hofmeister | ....... | H01L 21/68707 414/744.5 |
| 6,752,584 B2* | 6/2004 | Woodruff | .......... | H01L 21/67173 198/346.2 |
| 6,921,467 B2* | 7/2005 | Hanson | .................. | C25D 21/12 204/224 R |
| 10,424,498 B2 | 9/2019 | Hofmeister et al. | | |
| 10,742,070 B2 | 8/2020 | Hosek et al. | | |

(Continued)

*Primary Examiner* — Saul Rodriguez
*Assistant Examiner* — Brendan P Tighe
(74) *Attorney, Agent, or Firm* — Harrington & Smith

(57) ABSTRACT

An apparatus includes a platform configured to traverse a stationary base along a motion path; a drive coupled to the platform; and a movable arm assembly. The movable arm assembly includes a pivoting base connected to the drive, first and second linkages connected to the pivoting base, each linkage having links connected via rotary joints and each link having at least one end-effector. The platform is configured to traverse the stationary base along a motion path in two opposing directions and the drive and the movable arm assembly are configured to cause independent and simultaneous movement and transfer of substrates from at least one of a first substrate holding area, a second substrate holding area, a third substrate holding area, or a fourth substrate holding area into or from a respective substrate workstation.

20 Claims, 26 Drawing Sheets

(56) References Cited

U.S. PATENT DOCUMENTS

| | | |
|---|---|---|
| 11,269,604 B1 | 3/2022 | Parihar et al. |
| 2004/0151562 A1* | 8/2004 | Hofmeister ....... H01L 21/67184 |
| | | 414/217 |
| 2016/0229296 A1 | 8/2016 | Hosek et al. |
| 2018/0105044 A1 | 4/2018 | Hosek et al. |
| 2018/0105045 A1 | 4/2018 | Hosek et al. |
| 2020/0262660 A1 | 8/2020 | Hosek et al. |
| 2021/0245372 A1 | 8/2021 | Hosek et al. |
| 2022/0266456 A1 | 8/2022 | Hosek et al. |
| 2022/0297285 A1 | 9/2022 | Hosek |

\* cited by examiner

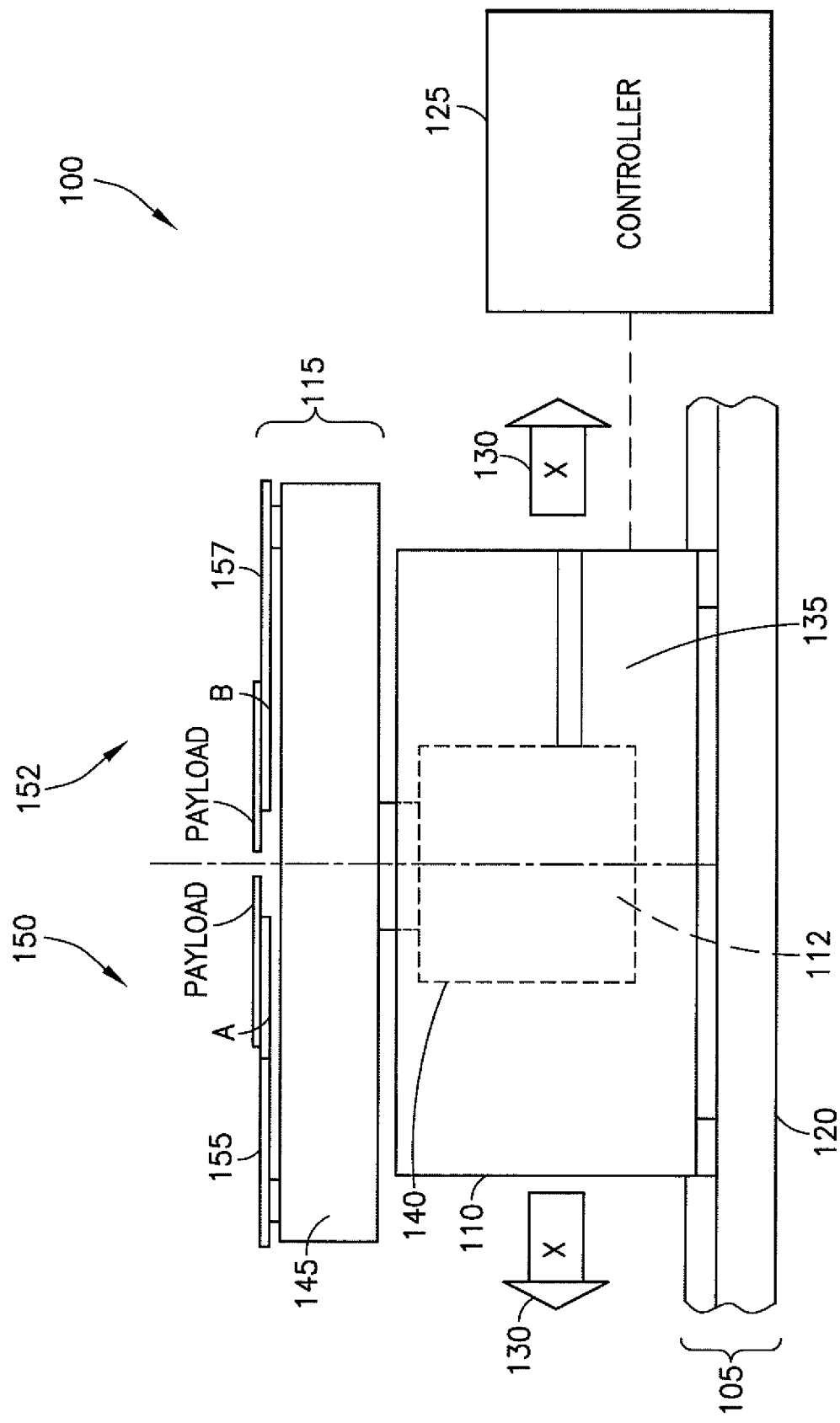

TRAVERSING ROBOT WITH MULTIPLE END EFFECTORS

CROSS REFERENCE TO RELATED APPLICATION

This application claims priority under 35 USC 119(e) to U.S. Provisional Application No. 63/303,682 filed Jan. 27, 2022, which is hereby incorporated by reference in its entirety.

BACKGROUND

Technical Field

The example and non-limiting embodiments relate generally to a robot and, more particularly, to a traversing robot with multiple end-effectors that can be utilized in material-handling vacuum-environment systems and other applications.

Brief Description of Prior Developments

Modern semiconductor manufacturing factories seek wafer processing systems with the following characteristics: a compact footprint (cost per unit area of factory floor space), capability of handling multiple wafers simultaneously (productivity, for example, the number of wafers processed per unit time), and capability of supporting flexible wafer flows (variety of recipes, maintenance of process modules during operation).

SUMMARY

The following summary is merely intended to be exemplary. The summary is not intended to limit the scope of the claims.

In accordance with one aspect, an apparatus comprises a platform configured to traverse a stationary base along a motion path; a drive coupled to the platform; and a movable arm assembly. The movable arm assembly comprises a pivoting base connected to the drive, a first linkage connected to the pivoting base, and a second linkage connected to the pivoting base. The first linkage comprises a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. The second linkage comprises a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The platform is configured to traverse the stationary base along a motion path in two opposing directions and the drive and the movable arm assembly are configured to cause independent and simultaneous movement and transfer of substrates from at least one of the first substrate holding area, the second substrate holding area, the third substrate holding area, or the fourth substrate holding area into or from a respective substrate workstation.

In accordance with another aspect, a method comprises providing a platform configured to traverse a stationary base along a motion path; providing a drive coupled to the platform; and connecting a pivoting base of a movable arm assembly to the drive. A first linkage of the mobile arm assembly is connected to the pivoting base and comprises a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. A second linkage of the mobile arm assembly is connected to the pivoting base and comprises a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The platform is configured to traverse the stationary base along a motion path in two opposing directions and the drive and the movable arm assembly are configured to cause independent and simultaneous movement and transfer of substrates from at least one of the first substrate holding area, the second substrate holding area, the third substrate holding area, or the fourth substrate holding area into a respective substrate workstation.

In accordance with another aspect, a method comprises placing a first substrate on a first substrate holding area of a first end-effector and placing a second substrate on a second substrate holding area of a second end-effector, wherein the first end-effector and the second end-effector form a portion of a movable arm assembly comprising a pivoting base connected to a drive, wherein the movable arm assembly further comprises a pivoting base connected to the drive, a first linkage connected to the pivoting base, the first linkage comprising a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. A second linkage is connected to the pivoting base, the second linkage comprising a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The method also comprises moving the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into or from a respective substrate workstation.

In accordance with another aspect, a non-transitory program storage device readable by a machine, tangibly embodying a program of instructions executable by the machine, comprises operations of placing a first substrate on a first substrate holding area of a first end-effector, placing a second substrate on a second substrate holding area of a second end-effector, placing a third substrate on a third substrate holding area of a third end-effector, and placing a fourth substrate on a fourth substrate holding area of a fourth end effector, wherein the first end-effector, the second end-effector, the third end-effector, and the fourth end-effector form a portion of a movable arm assembly comprising a pivoting base connected to a drive, wherein the movable arm assembly further comprises a pivoting base connected to the drive, a first linkage connected to the pivoting base, the first linkage comprising a first upper link coupled to the pivoting base through a first rotary joint, the first upper link comprising the first end-effector having at least the first substrate holding area, and a first lower link coupled to the pivoting base through a second rotary joint, the first lower link comprising the second end-effector having at least the second substrate holding area, wherein the first rotary joint is substantially coaxial with the second rotary joint, and a second linkage connected to the pivoting base, the second linkage comprising a second upper link coupled to the pivoting base through a third rotary joint, the second upper link comprising the third end-effector having at least the third substrate holding area, and a second lower link coupled to the pivoting base through a fourth rotary joint, the second lower link comprising the fourth end-effector having at least the fourth substrate holding area, wherein the third rotary joint is substantially coaxial with the fourth rotary joint. The operations also comprise controlling a movement of the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into a respective substrate workstation.

BRIEF DESCRIPTION OF THE DRAWINGS

The foregoing aspects and other features are explained in the following description, taken in connection with the accompanying drawings, wherein:

FIGS. 10(a) and 10(b) are schematic cross-sectional views of exemplary rotary thermal couplings;

FIGS. 8-14 are schematic representations of examples of traversing robots.

DETAILED DESCRIPTION

Figure 1B:
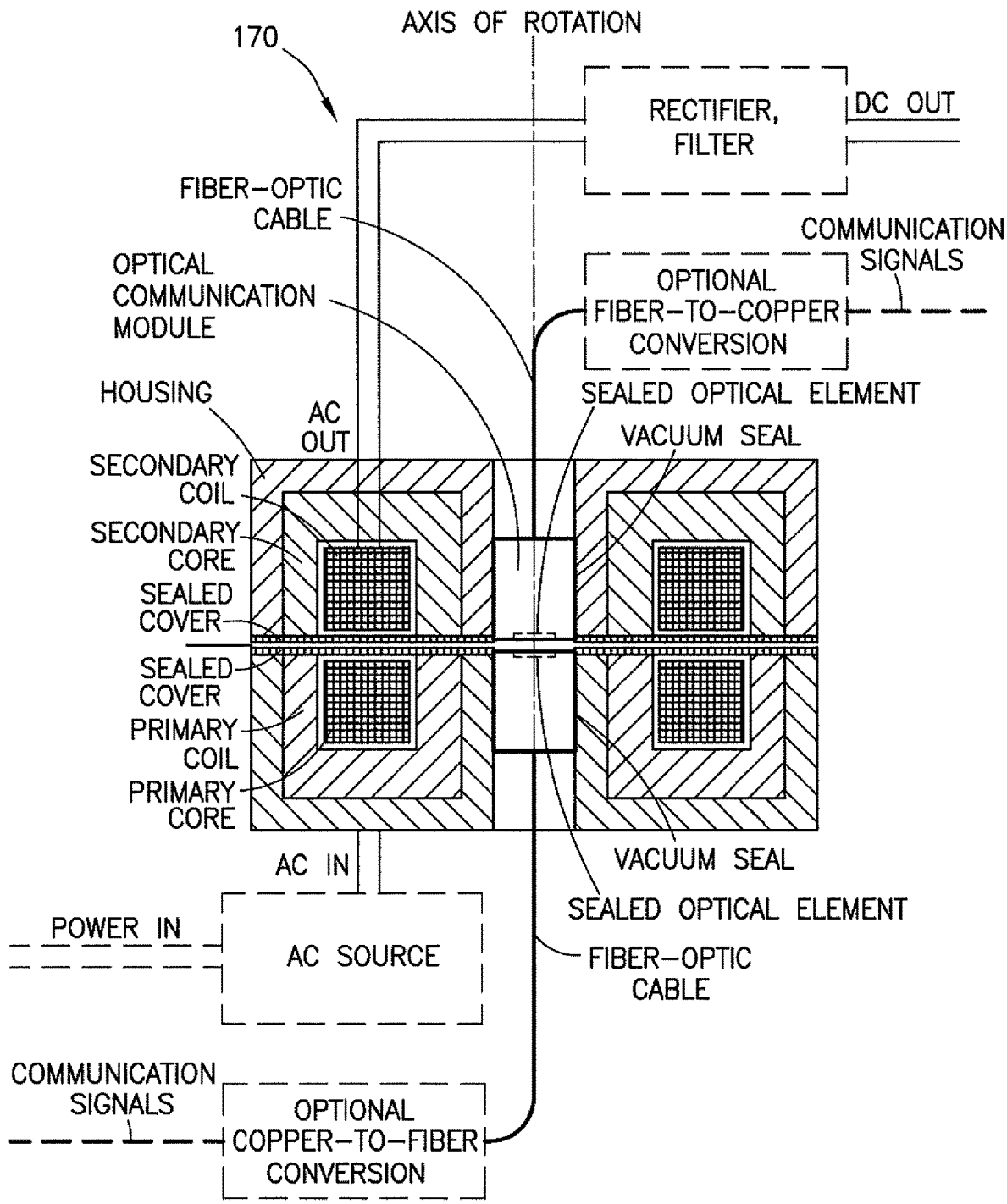
FIG. 1B is a schematic cross-sectional view of one example of a rotary coupling.

Although the features will be described with reference to the example embodiments shown in the drawings, it should be understood that features can be embodied in many alternate forms of embodiments. In addition, any suitable size, shape, or type of elements or materials could be used.

Referring to FIG. 1A, one example embodiment of a traversing robot having multiple end-effectors is depicted diagrammatically at 100 and is hereinafter referred to as "robot 100." Robot 100 comprises a linear guidance and actuation system 105, a traversing platform 110, and a robot arm 115. As shown, the robot 100 may be supported by a stationary base 120. One feature as described herein is to provide a robot (for example, the robot 100) as being capable of traversing motion in a system or environment having limited space or a narrow architecture and featuring multiple end-effectors that support a simultaneous handling of multiple wafers and being capable of picking and placing wafers from/to workstations either simultaneously or individually (to accommodate flexible wafer flows). Although the robot 100 (as well as other example robots disclosed herein) is shown as exhibiting traversing motion in linear opposing directions, it should be understood that the robot 100 may traverse a curved motion path.

The robot 100 may comprise or be connected to a controller 125. The controller 125 may comprise, for example, at least one processor and at least one memory including one or more computer programs.

Still referring to FIG. 1A, the stationary base 120 may be a structure configured to support the robot 100. As an example, the stationary base 120 may be a plate or a frame extended along the direction of traversing motion of the robot 100, a floor or a wall of a vacuum chamber, or any other suitable structure capable of supporting the robot 100.

The linear guidance and actuation system 105 may comprise a linear guidance arrangement and a linear actuation arrangement configured to facilitate the traversing motion of the traversing platform 110 with respect to the stationary base 120. For example, the traversing motion of the traversing platform 110 may be facilitated in the direction along the x-axis as shown by arrows 130 in FIG. 1A.

The linear guidance arrangement may be formed by a linear bearing arrangement. As an example, the linear bearing arrangement may include one or more linear bearing rails attached to the stationary base 120 and one or more linear bearing blocks attached to the traversing platform 110. The linear guidance arrangement may further include a shield configured to prevent components associated with the robot 100 from contacting the linear bearing rail(s) to prevent debris from contaminating linear bearing(s) and to prevent particles from migrating out of the linear bearing(s) and depositing on the linear bearing rails.

Alternatively, the linear guidance arrangement may be a system of wheels and rails, a cable or belt suspension system, a magnetic support system or any other suitable arrangement configured to constrain the motion of the traversing platform 110 with respect to the stationary base 120. An example may comprise features as described in U.S. Pat. Nos. 10,424,498; 10,269,604; and 10,742,070, as well as US Patent Publication No. US 2020/0262660 A1, all of which are hereby incorporated by reference in their entireties.

The linear actuation arrangement may comprise one or more linear actuators and one or more position sensors (not depicted in FIG. 1A for simplicity). The linear actuator of the linear actuation arrangement may comprise a stationary portion, which may be attached to the stationary base 120, and a movable portion, which may be attached to the traversing platform 110. For example, the linear actuator may be a linear motor, such as a permanent magnet linear motor. In a linear actuator having a moving coil arrangement, the movable portion may comprise a forcer with coils, and the stationary portion may be formed by a magnet track. In a linear actuator having a moving magnet arrangement, the movable portion may comprise a magnet plate, and the stationary portion may be formed by a track of coils.

Alternatively, the linear actuation arrangement may be based on a belt drive, band drive, cable drive, ball-screw, leadscrew, or any other suitable arrangement capable of producing a force between the stationary base 120 and the traversing platform 110 substantially in the direction of the desired traversing motion (shown by arrows 130) of the robot 100.

The position sensor of the linear actuation arrangement may be configured to measure the position of the traversing platform 110 along the desired direction of traversing motion according to arrows 130. As an example, the position sensor may be a position encoder, such as an optical, magnetic, inductive or capacitive position encoder, a laser interferometer, or any other suitable device capable of measuring directly or indirectly (for example, in the case of a belt drive, band drive, cable drive, ball-screw, leadscrew) the position of the traversing platform 110 along the desired direction of traversing motion according to arrows 130.

Data obtained from the position sensor may be utilized by the controller 125 to control the linear actuator (linear motor, moving coil arrangement, moving magnetic arrangement, or the like) in order to achieve the desired motion or stationary position of the traversing platform 110 with respect to the stationary base 120 along the direction of the desired traversing motion (arrows 130) of the robot 100.

Figure 1C:
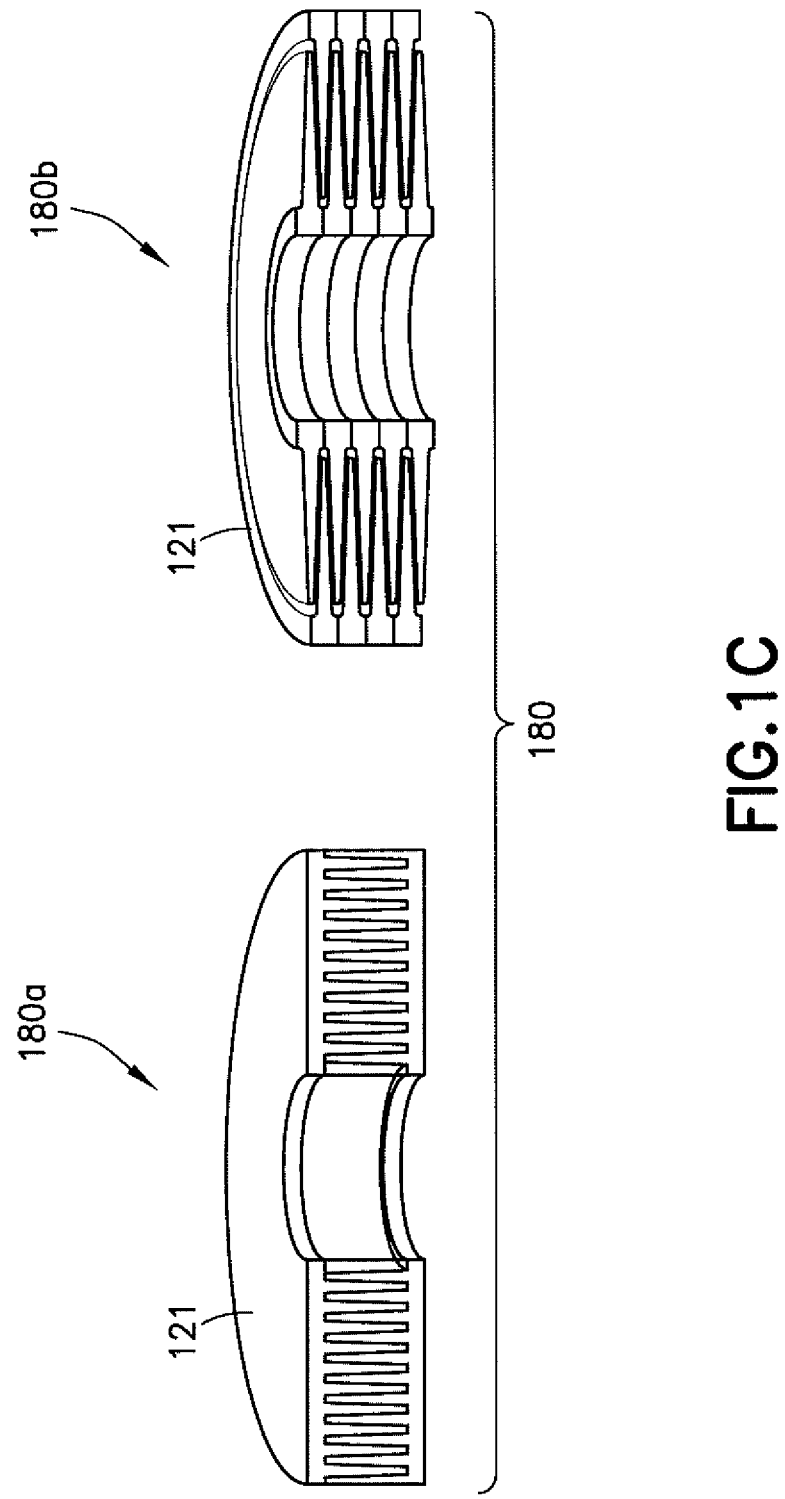
FIG. 1A is a schematic representation of one example of a traversing robot.
Figure 1D:
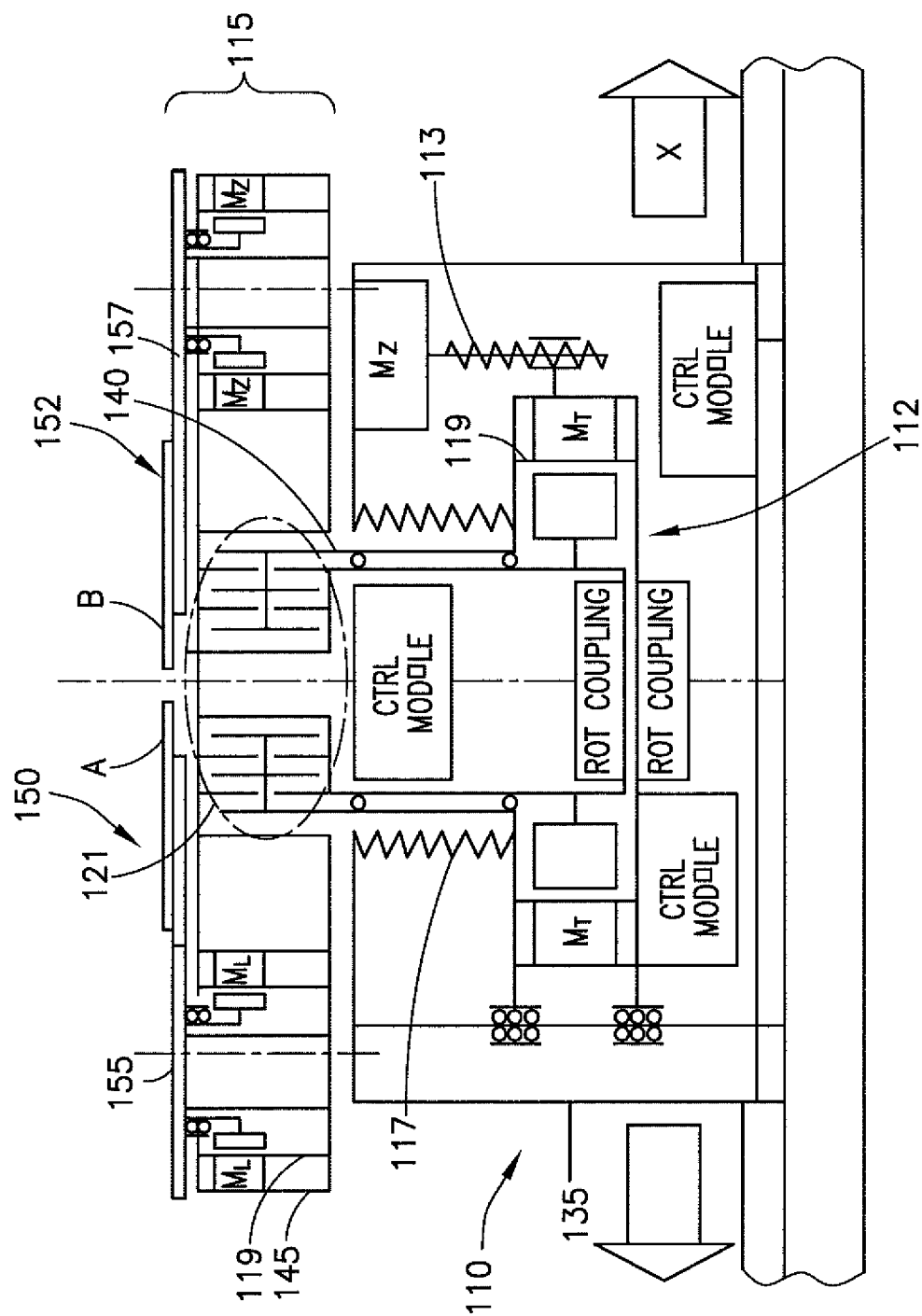

Referring to FIG. 1D, the traversing platform 110 may comprise a drive 112 or other means to effect movement of the traversing platform 110 and the robot arm 115, the drive 112 being located in an external housing 135. A spindle assembly 111 may be located inside the external housing 135 and configured to rotate the robot arm 115. The spindle assembly may comprise a spindle housing, a motor $M_T$, and a drive shaft 140, a portion of which also can be seen in FIG. 1A, extending from the external housing 135 to the robot arm 115. If so desired, a vertical lift mechanism may be used using motor $M_Z$, for example, comprising one or more linear rail-bearing arrangements and a motor-driven ball-screw 113, configured to lift the spindle up or down in a vertical direction.

If the traversing platform 110 features a vertical lift mechanism, the spindle housing and inner portions of the external housing 135 of the traversing platform 110 may include surfaces that may face each other or are at least positioned in close proximity to each other to facilitate heat transfer from the spindle housing to the external housing 135. As an example, the spindle housing and the external housing 135 may feature interleaving features, for example, fins, to increase the effective area available for heat transfer while allowing for vertical motion of the spindle assembly with respect to the external housing 135. The effective surfaces may be treated to improve their thermal emissivity. For example, various components may be made of aluminum and the effective surfaces may be anodized. Additional and alternative power, communication, and thermal management arrangements and features can be found in US Patent Publication No. US 2021/0245372 A1, filed on Feb. 10, 2021.

The traversing platform 110 may be sealed (for example, at a separation barrier 119) to separate its internal volume from the external environment, for instance, a vacuum environment. If a vertical lift mechanism is present, a bellows arrangement 117 between the external housing 135 and the spindle housing may be utilized to accommodate vertical motion of the spindle.

The spindle of the traversing platform 110 may include sealing and other features that may allow the drive shaft or an upper portion of the drive shaft to be in the external environment, such as a vacuum environment. As an example, a substantially cylindrical separation barrier between the rotor of the motor and the stator of the motor may be utilized to contain the internal environment on the stator side of the separation barrier and the external environment, such as vacuum environment, on the rotor side of the separation barrier, in which case the drive shaft may reside in the external environment, such as a vacuum environment, in its entirety. Alternative sealing arrangements may be used.

The robot 100 may comprise a distributed actuator structure. Actuators, for example, motors $M_L$ or $M_R$, may be located in a pivoting base 145 of the robot arm 115 to provide distributed power to the linkages 150, 152. In other example embodiments, the actuators (for example, various motors) may be located in or on the various links of the linkages to drive the various linkages and links individually or in conjunction with the actuators or motors located in the pivoting base 145. Examples of robots having distributed actuator architectures are illustrated in US Patent Publication Nos. US 2022/0266456 and US 2022/0297285, which are incorporated by reference herein in their entireties.

Referring back to FIG. 1A, the robot arm 115 may comprise the pivoting base 145 connected to the drive shaft 140 and two or more linkages 150, 152 coupled to the pivoting base 145. The pivoting base 145 operates as a common upper arm for the linkages 150, 152 and pivots substantially about a geometric center of structure defining the pivoting base. For example, the pivoting base 145 pivots on the drive shaft 140 at a point that is equidistant from the sides and ends of the pivoting base 145. As an example, the two or more linkages (a first linkage 150 and a second linkage 152) coupled to the pivoting base 145 may include a first link 155 and a second link 157, respectively.

The pivoting base 145 may include motors configured to drive the two or more linkages 150, 152. As an example, the motors may be arranged to two or more spindle assemblies, each spindle configured to drive one of the two or more linkages 150, 152. As an example, the pivoting base 145 may include a first motor (or actuator) configured to drive the first linkage 151 and a second motor (or actuator) configured to drive the second linkage 152.

In order to provide power to active components in the robot arm 115, control module(s) associated with the motors are located in the pivoting base 145 or in the traversing platform 110. To effect communication between the control module(s) and the motors in the pivoting base 145, one or more rotary couplings may be utilized. A rotary coupling may include a power coupling configured to transmit power through a rotary joint and/or a communication link configured to transmit communication signals through a rotary joint. For example, a rotary coupling may be utilized to transmit power from the spindle assembly of the traversing platform 110 to the pivoting base 145 and to transmit communication signals between the spindle assembly of the traversing platform 110 and the pivoting base 145 of the robot arm 115.

The power coupling may operate on various physical principles and their combinations, including a slip-ring arrangement, which may comprise one or more electrically conductive rings, each in contact with one or more electrically conductive brushes, a slip-ring arrangement wetted by an electrically conductive fluid, such as an ionic liquid, a contactless capacitive coupling, and/or a contactless inductive coupling. One example of a power coupling operating on an inductive principle is described in U.S. Patent Publications Nos. US 2016/0229296, US 2018/0105044, and US 2018/0105045.

The communication link, as an example, may include two optical communication modules, one stationary with respect to the housing of the spindle assembly of the traversing platform 110 and the other rotating together with the pivoting base 145 of the robot arm 115. The communication link may facilitate contactless data transfer between the spindle assembly of the traversing platform 110 and the pivoting base 145. As an example, the communication link may be incorporated into a communication network of the controller 125 and may facilitate bidirectional data transfer to and from the control module(s) associated with the motors located in the pivoting base 145.

A simplified cross-sectional view of an example integrated rotary coupling, which may include an inductive power coupling and an optical communication link, is depicted diagrammatically in FIG. 1B at 170.

Referring back to FIG. 10, in order to remove heat from the pivoting base 145, including the heat generated by the actuators (motors) attached to the pivoting base 145, a rotary thermal coupling 121 may be utilized between the pivoting base 145 and the housing of the spindle assembly of the traversing platform 110. An example rotary thermal coupling 121 may comprise two portions, each featuring one or more substantially cylindrical surfaces aligned coaxially with the axis of rotation and arranged so that a cylindrical surface on one portion of the thermal coupling 121 faces an opposing cylindrical surface on the other portion of the thermal coupling 121. The opposing cylindrical surfaces may be configured to transfer heat via radiation across a gap between the opposing substantially cylindrical surfaces of the rotary thermal coupling 121. The radiation mechanism may be supplemented by convection/conduction through the environment between the opposing substantially cylindrical surfaces of the rotary thermal power coupling if residual gasses are present in the vacuum environment.

As illustrated in the example shown in FIG. 1C at 180, in order to increase the effective area and minimize the volume occupied by the example rotary thermal coupling 121, an array of substantially cylindrical features (shown at (a) in FIG. 1C) may be provided on each of the two portions of the rotary thermal coupling, and the two arrays may be arranged in an interleaving manner.

Alternatively, as depicted at (b) in FIG. 1C, the two portions of the rotary thermal coupling 121 may provide opposing disk-shaped features configured for contactless heat transfer across the gap between them. As another alternative, any other suitable shapes of the effective features of the rotary thermal coupling, including but not limited to conical and spherical shapes, and their combination may be utilized.

The effective surfaces of the rotary thermal coupling may be treated to improve their thermal emissivity. For example, the two portions of the rotary thermal coupling may be made of aluminum and the effective surfaces may be anodized.

In order for the example rotary thermal coupling 121 to facilitate heat transfer between the pivoting base 145 and the housing of the spindle assembly of the traversing platform 110, one portion of the rotary thermal coupling 121 may be attached to the pivoting base 145 and the other portion of the rotary power coupling 121 may be attached to the housing of the spindle assembly of the traversing platform 110 in an arrangement substantially coaxial with the axis of rotation of the drive shaft 140. Alternatively, the features of the rotary thermal coupling 121 may be incorporated directly into the pivoting base 145 and/or the housing of the spindle assembly of the traversing platform 110.

As explained above, the robot arm 115 may comprise the pivoting base 145 connected to the drive shaft 140 and the linkages 150, 152 coupled to the pivoting base 145. As an example, the linkages 150, 152 may include the first link 155 and the second link 157.

In one example embodiment, for example as depicted diagrammatically in FIG. 1A, the first link 155 may comprise a single link with an end-effector (end-effector A) configured to carry a payload, such as a semiconductor wafer. Similarly, the second link 157 may comprise a single link with an end-effector (end-effector B) configured to carry a payload, such as a semiconductor wafer.

Figure 2:
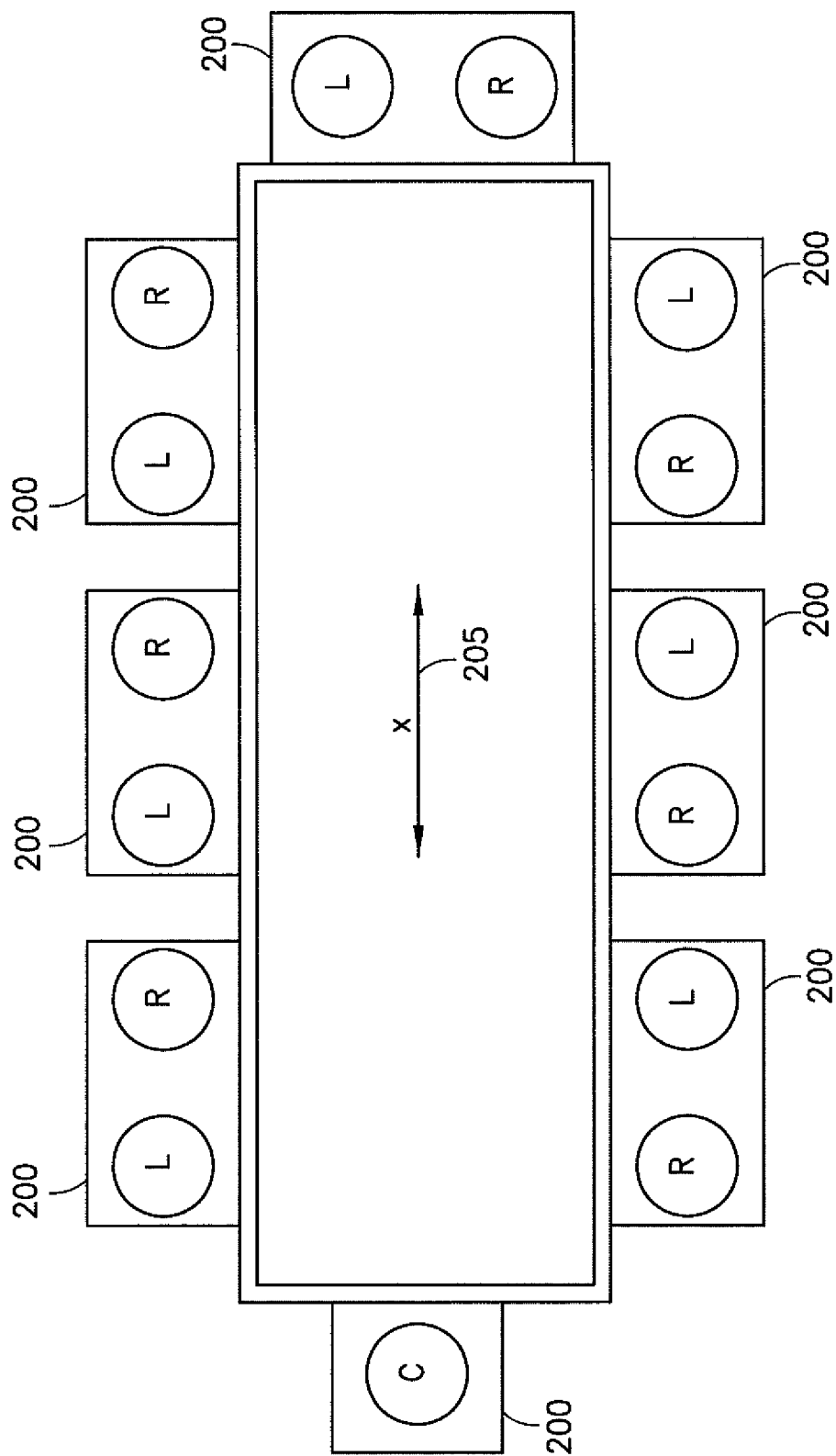
FIG. 2 is a diagrammatic view of a workstation environment having a narrow architecture and one example of a motion path for a robot in the workstation environment.

Referring now to FIG. 2, the robot 100 (as shown in FIG. 1A) may be used to pick and place material, such as semiconductor wafers, from and to workstations 200 arranged along a motion path 205 of the traversing platform 110 and adjacent to each end of the motion path 205 of the traversing platform 110. The workstations 200 may be arranged in pairs (twin workstations), with twin workstations being positioned opposite each other across the motion path 205. In this twin arrangement, each twin workstation pair may include a left workstation (L) and a right workstation (R).

The controller 125 of the robot 100 can be utilized to position the traversing platform 110 substantially in front of a pair of workstations 200, extend end-effector A to a left workstation, extend end-effector B to a right station, extend end-effector A to a right station, and extend end-effector B to a left station. The capability of accessing left and right stations with either of the two end-effectors A, B may be conveniently utilized to move wafers from left workstations to right workstations and vice versa should the recipe and wafer flow require such movement.

Figure 3A:
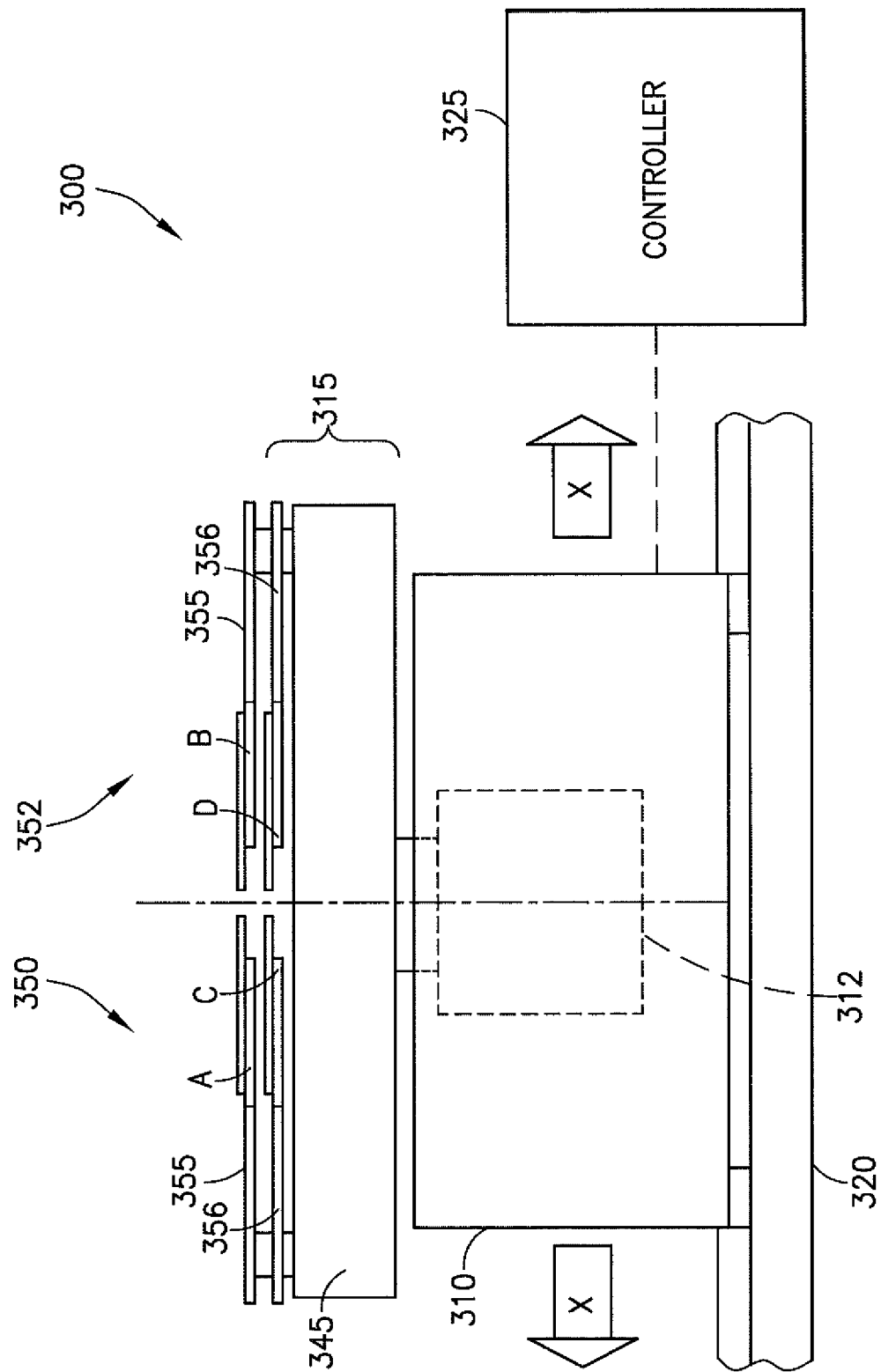
FIG. 3A is a schematic representation of another example of a traversing robot.
Figure 3B:
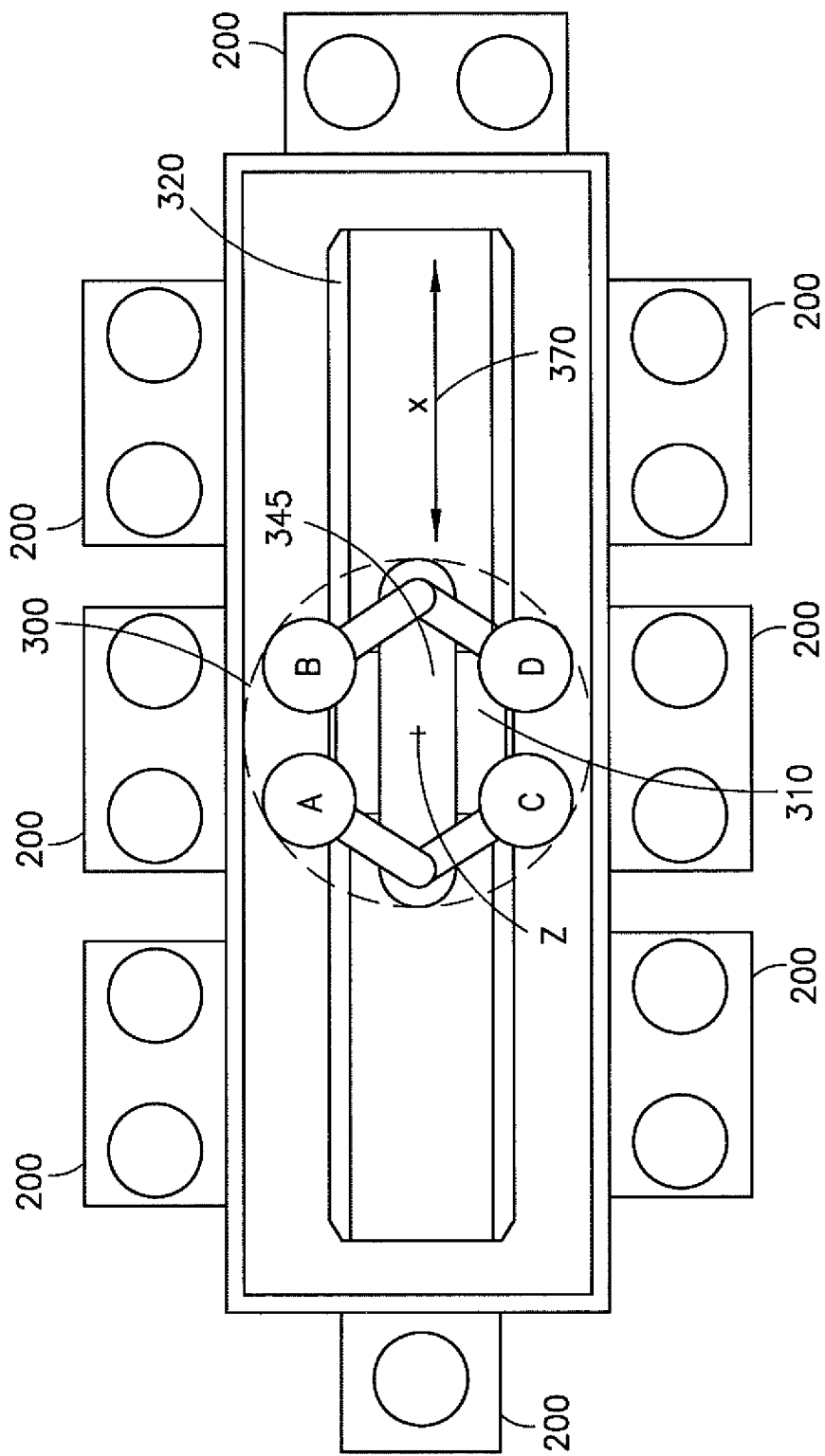
FIG. 3B is a diagrammatic view of another workstation environment and motion path for the robot of FIG. 3A.

Referring now to FIGS. 3A and 3B, another example embodiment of a robot 300 and movement thereof along a motion path 370 is depicted diagrammatically. FIG. 3A illustrates a side view of the robot 300, which includes or is associated with a controller 325, and FIG. 3B illustrates a top view of the motion path 370 along which robot 300 may move, for example, along a stationary base 320. As depicted diagrammatically in FIG. 3A, the robot 300 may have a movable traversing platform 310 and a robot arm 315 having a pivoting base 345 (common upper arm of the robot 300) on which two linkages are mounted. The robot 300 may also include a drive 312 to effect movement of the traversing platform 310 and the robot arm 315. A first linkage 350 on the pivoting base 345 may comprise two links, for example, an upper link 355 and a lower link 356, each coupled to the pivoting base 345 through rotary joints arranged, for example, in a substantially coaxial manner. Each of the two links 355, 356 may support an end-effector configured to carry a payload, such as a semiconductor wafer. For example, the upper link 355 may support end-effector A and the lower link 356 may support end-effector C.

Similarly, a second linkage 352 on the pivoting base 345 may comprise two links, an upper link 357 and a lower link 358, each coupled to the pivoting base 345 through another set of rotary joints arranged, for example, in a substantially coaxial manner. Each of the two links 357, 358 may support an end-effector configured to carry a payload, such as a semiconductor wafer, into a workstation 200. For example, the upper link 357 may support end-effector B and the lower link 358 may support end-effector D. As depicted in FIG. 3B, the pivoting base 345 (common upper arm) comprises an elongated member rotatably coupled to the traversing platform 310 at a point Z that is substantially in the center of the elongated member.

Figure 4A:
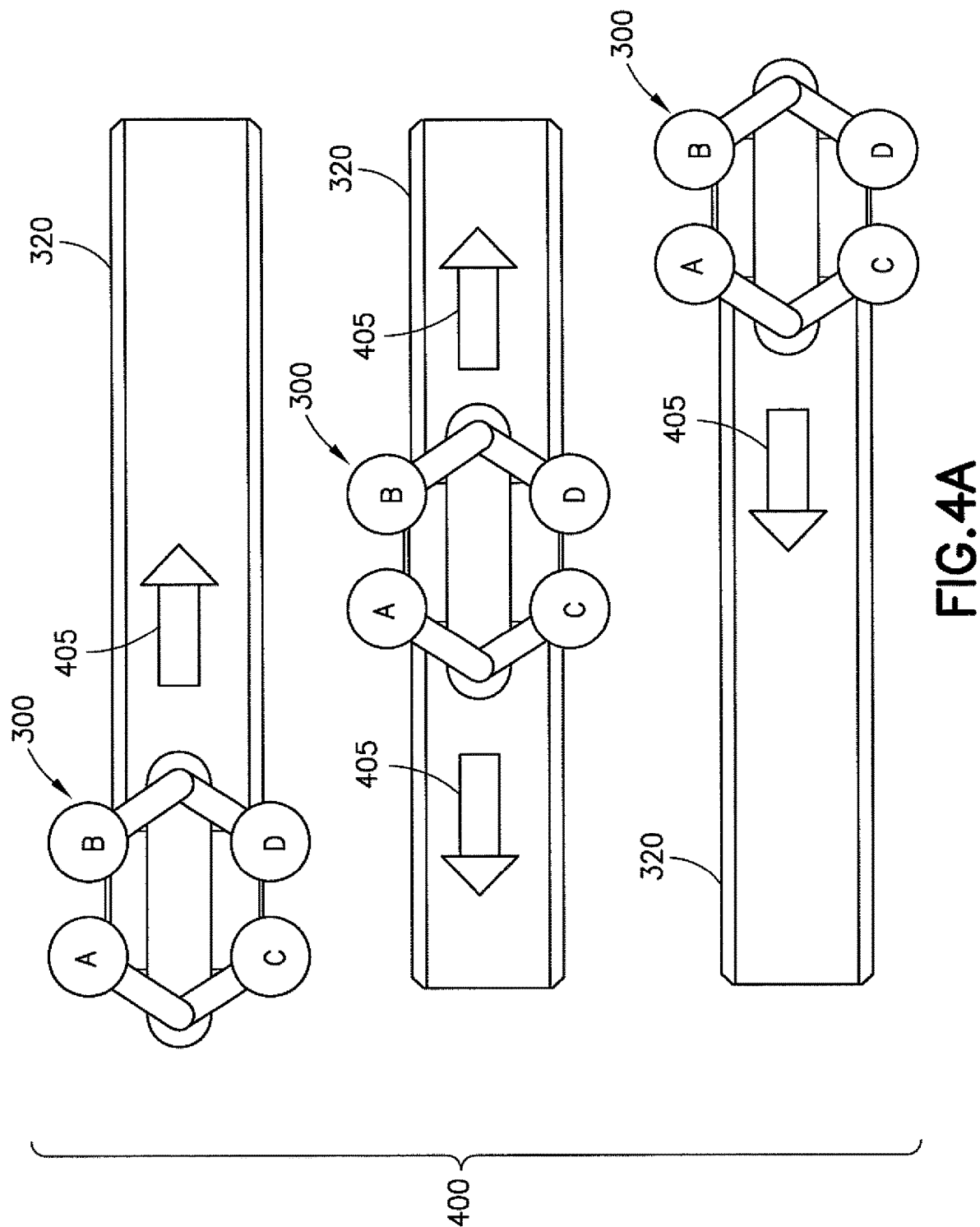
FIG. 4A is a diagrammatic view of the example robot of FIG. 3A operating in linear motion paths.
Figure 4B:
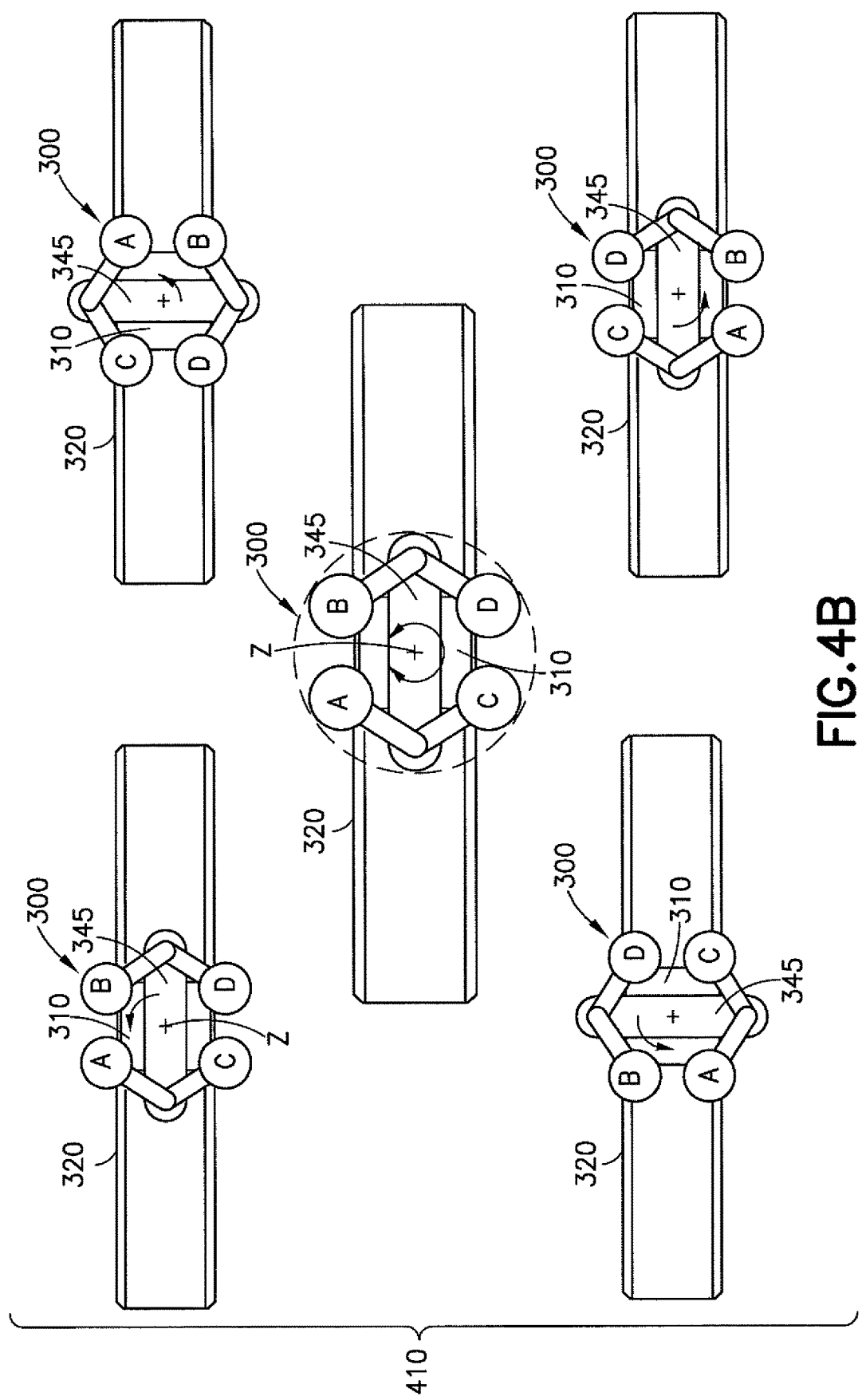
FIGS. 4B-4D are diagrammatic views of example operations of the robot of FIG. 3A.
Figure 4C:
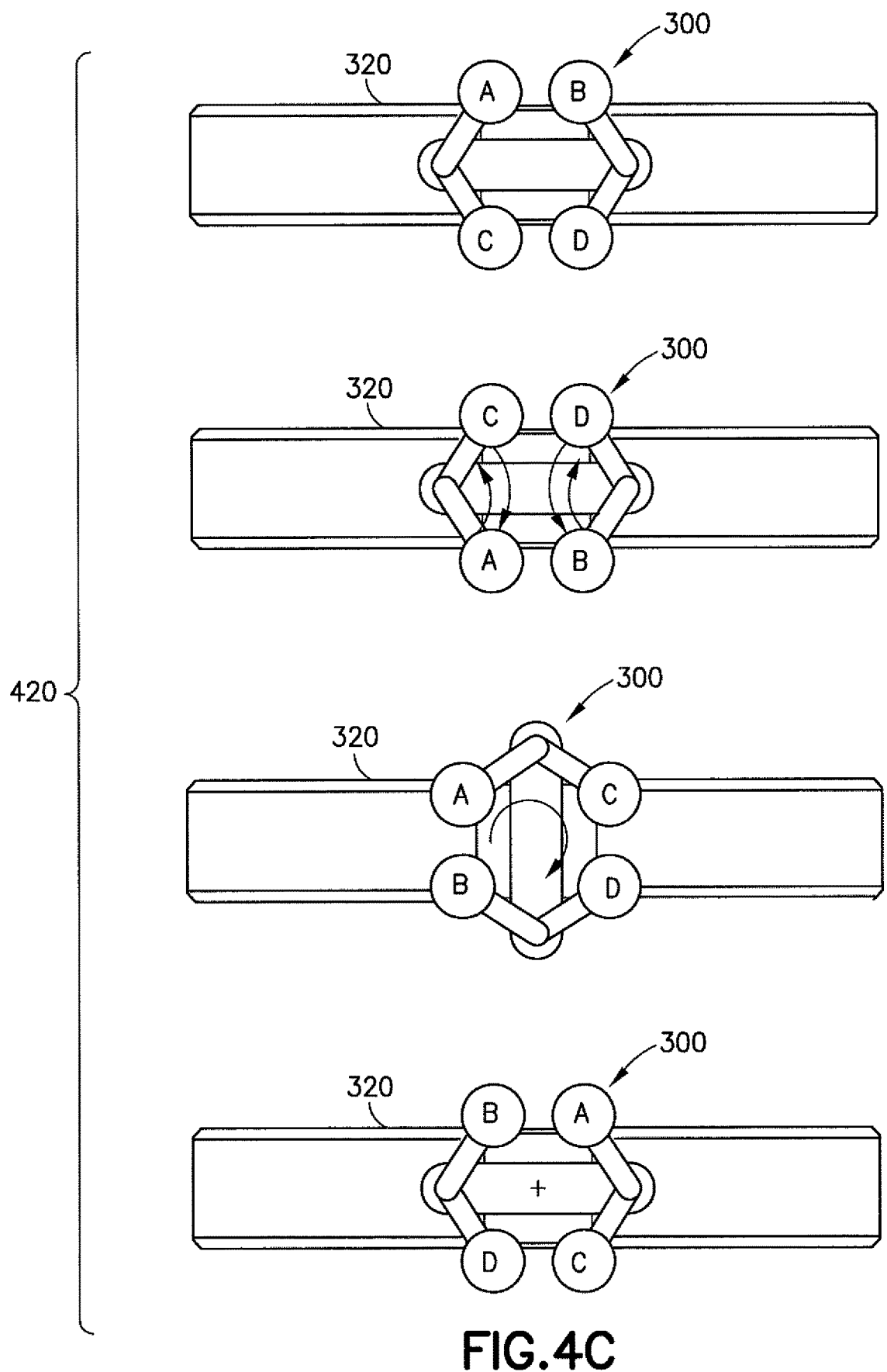
Figure 4D:
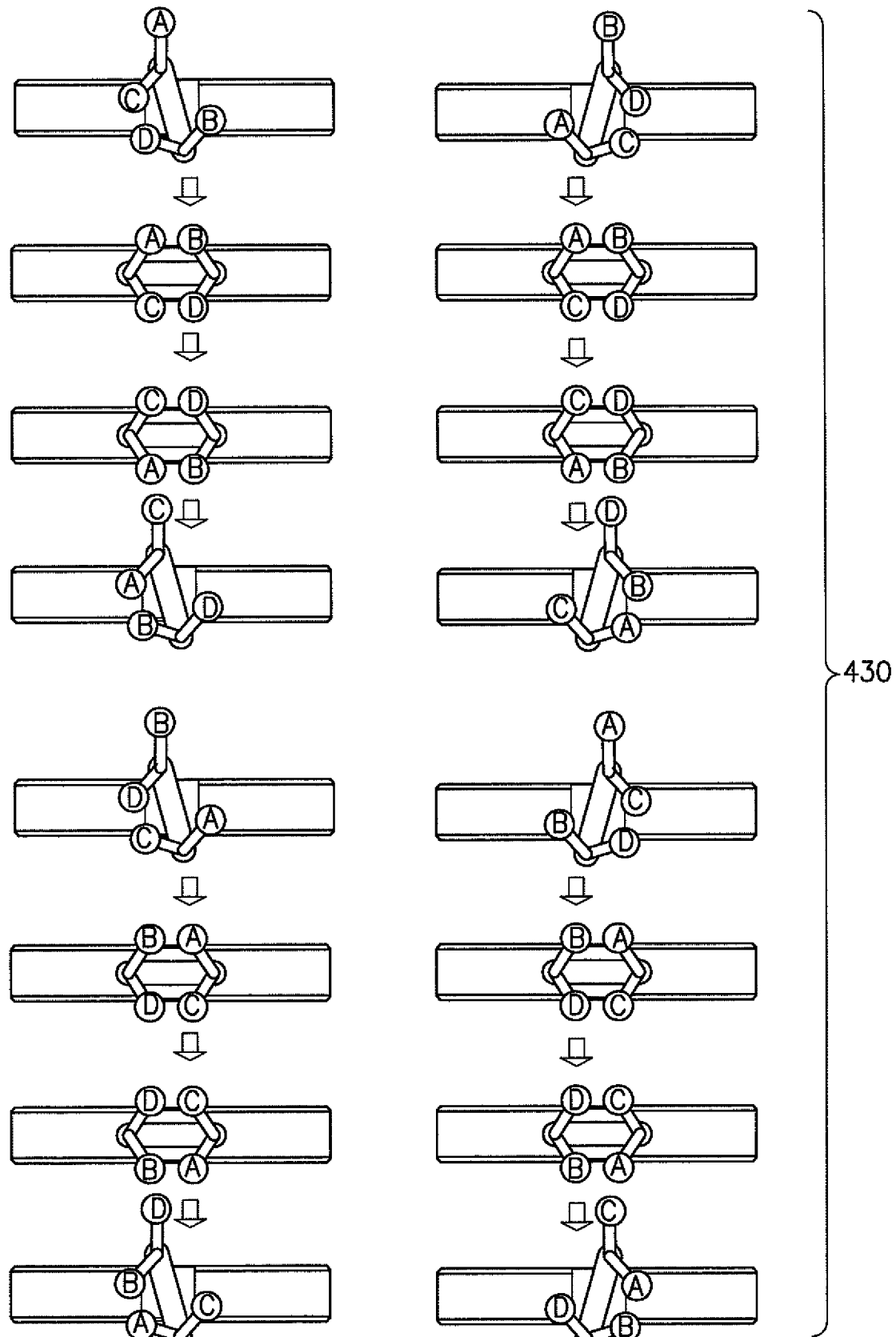

The operation of the example robot 300 of FIG. 3A is illustrated diagrammatically in FIGS. 4A-40. FIGS. 4A-4D illustrate example uses of the pivoting base 345 as the common upper arm (pivotal about point Z) and two pairs of forearms or end effectors attached to opposite ends of the common upper arm. FIG. 4A at 400 shows traversing motion of the robot 300 in linear directions indicated by arrows 405. FIG. 4B at 410 shows rotational motion of the pivoting base 345 about point Z in various directions. FIG. 4C at 420 shows a transition of end-effectors A and C from left to right accompanied by a transition of end-effectors B and D from right to left. FIG. 4D at 430 shows how the robot 300 may extend and retract various end-effectors independently and simultaneously (not all possible combinations are shown). U.S. Pat. No. 9,149,936 shows an angled common upper arm which is hereby incorporated by reference in its entirety.

To summarize some of the operations, the example robot of FIGS. 3A and 3B may extend end-effector A independently to a left workstation, extend end-effector C independently to a left workstation, extend end-effector A and C simultaneously to a left workstation, extend end-effector B independently to a right workstation, extend end-effector D independently to a right workstation, extend end-effector B and D simultaneously to a right workstation, extend end-effector A independently to a right workstation, extend end-effector C independently to a right workstation, extend end-effectors A and C simultaneously to a right workstation, extend end-effector B independently to a left workstation, extend end-effector D independently to a left workstation, and extend end-effector B and D simultaneously to a left workstation.

Having an additional pair of end-effectors compared to the embodiment of robot 100 as illustrated in FIG. 1A, the example robot 300 of FIG. 3 can be utilized to perform a rapid wafer exchange operation at a workstation 200 by picking a processed wafer from the workstation 200 and immediately replacing it with a fresh or unprocessed wafer carried on another end-effector. For example, the robot 300 can pick a processed wafer from the left (or right) of the workstation 200 using end-effector A and place a fresh or unprocessed wafer to the same left (or right) position of the workstation 200 using end-effector B.

Again, the capability of accessing left and right positions in the workstations 200 with any of the end-effectors may be conveniently utilized to move wafers from left to right and vice versa should the recipe and wafer flow require such movement.

Figure 5:
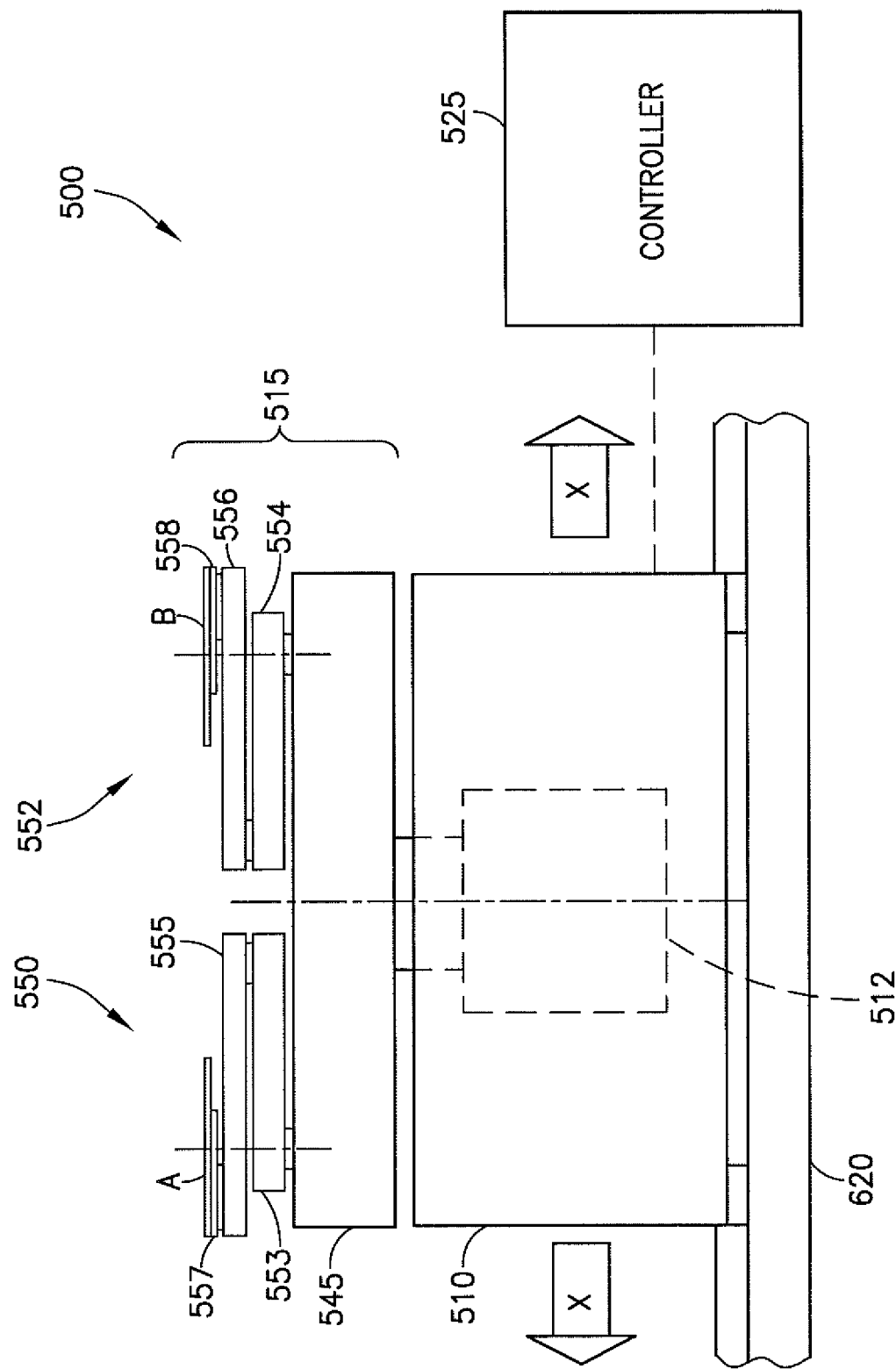
FIG. 5 is a schematic representation of another example of a traversing robot.

In another example embodiment of a robot as depicted diagrammatically at 500 in FIG. 5 and having a robot arm 515, a first linkage 550 may comprise a first link 553 (upper arm) coupled to a pivoting base 545 (common upper arm) via a rotary joint, a second link 555 (forearm) coupled to the first link 553 via a rotary joint, and a third link 557 (wrist) coupled to the second link 555 via a rotary joint. The robot 500 comprises a traversing platform 510 that traverses a stationary base 520. The robot 500 also includes a drive 512 to effect movements of the robot 500, for example movements of the traversing platform 510 and the robot arm 515. The robot 500 includes or is associated with a controller 525. The first link 553 may be driven directly by a motor located in the pivoting base 545, the second link 555 may be driven through a belt, band, or cable drive by another motor located in the pivoting base 545, and the third link 557 may be constrained via a belt, band, or cable drive to point radially with respect the rotary joint between the first link 553 and the pivoting base 545.

Similarly, a second linkage 552 may comprise a first link 554 (upper arm) coupled to the pivoting base 545 (common upper arm) via a rotary joint, a second link 556 (forearm) coupled to the first link 554 via a rotary joint, and a third link 558 (wrist) coupled to the second link 556 via a rotary joint. The first link 554 may be driven directly by a motor located in the pivoting base 545, the second link 556 may be driven through a belt, band, or cable drive by another motor located in the pivoting base 545, and the third link 558 may be constrained via a belt, band, or cable drive to point radially with respect the rotary joint between the first link 554 and the pivoting base 545.

The example robot 500 of FIG. 5 may extend end-effector A to a left workstation independently, extend end-effector B to a right station independently, extend end-effector A to a left station and end-effector B to a right station simultaneously, extend end-effector A to a right workstation independently, extend end-effector B to a left station independently, and extend end-effector A to a right station and end-effector B to a left station simultaneously.

Similar to the example embodiment of FIG. 1A, the capability of accessing left and right positions in workstations 200 with either of the two end-effectors may be conveniently utilized to move wafers from left positions in workstations 200 to right positions in workstations 200 and vice versa should the recipe and wafer flow require movement.

In addition, compared to the example embodiment of FIG. 1A, the example robot 500 of FIG. 5 can pick and place wafers from and to left and right workstations 200 simultaneously. Furthermore, the capability of positioning the two end-effectors independently may be conveniently utilized to compensate for misalignment of a wafer on one end-effector and, simultaneously, compensate for misalignment of a wafer on the other end-effector when the wafers are being delivered simultaneously to a pair of workstations 200. These capabilities may result in improved productivity (number of wafer processes per unit time).

Referring still to FIG. 5, the example robot 500 may comprise an architecture with distributed actuators, for example motors located in linkages or the pivoting base 545 to drive the linkages. The robot arm 515 may comprise the pivoting base 545 (which may be located in an atmospheric or non-vacuum environment, for example) connected to the drive 512 at what is deemed to be a shoulder joint. The linkages 550, 552 may be coupled to the pivoting base 545 via the rotary joints and may be in an atmospheric or non-vacuum environment.

In the example robot 500, particularly with regard to distributed actuator architectures in which the actuators or motors associated with the robot arm 515 are distributed throughout portions of the robot arm 515, the actuators or motors may be controlled by a control module located in close proximity to the corresponding motors.

In the example robot 500, upper parts of the robot arm 515 may be located in and be subject to the vacuum environment. The internal volumes of the upper portions of the linkages 550, 552 may be sealed from the vacuum environment and filled with air, another mix of gases or a single gas, for example, nitrogen.

Figure 6A:
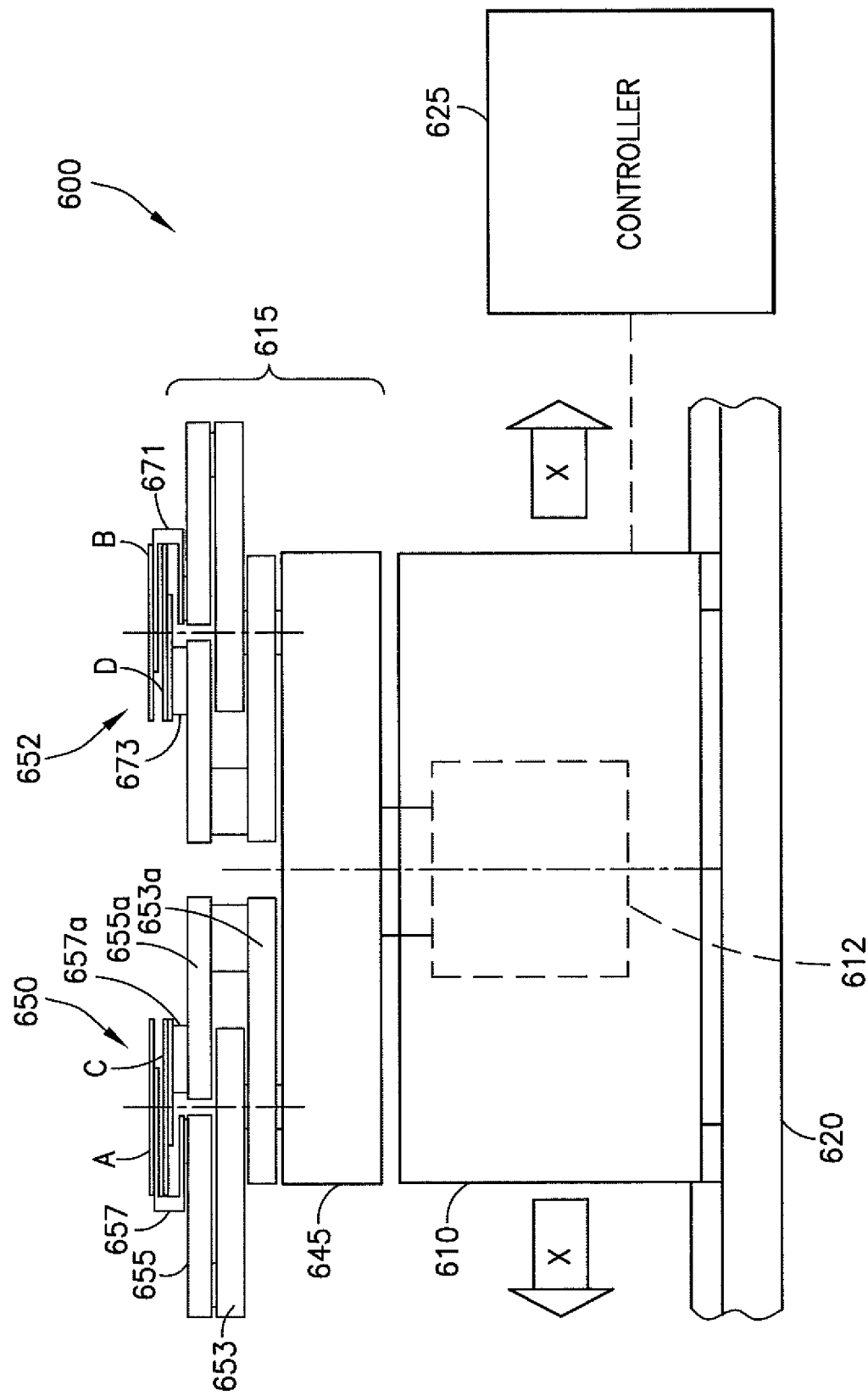
FIG. 6A is a schematic representation of another example of a traversing robot.
Figure 6B:
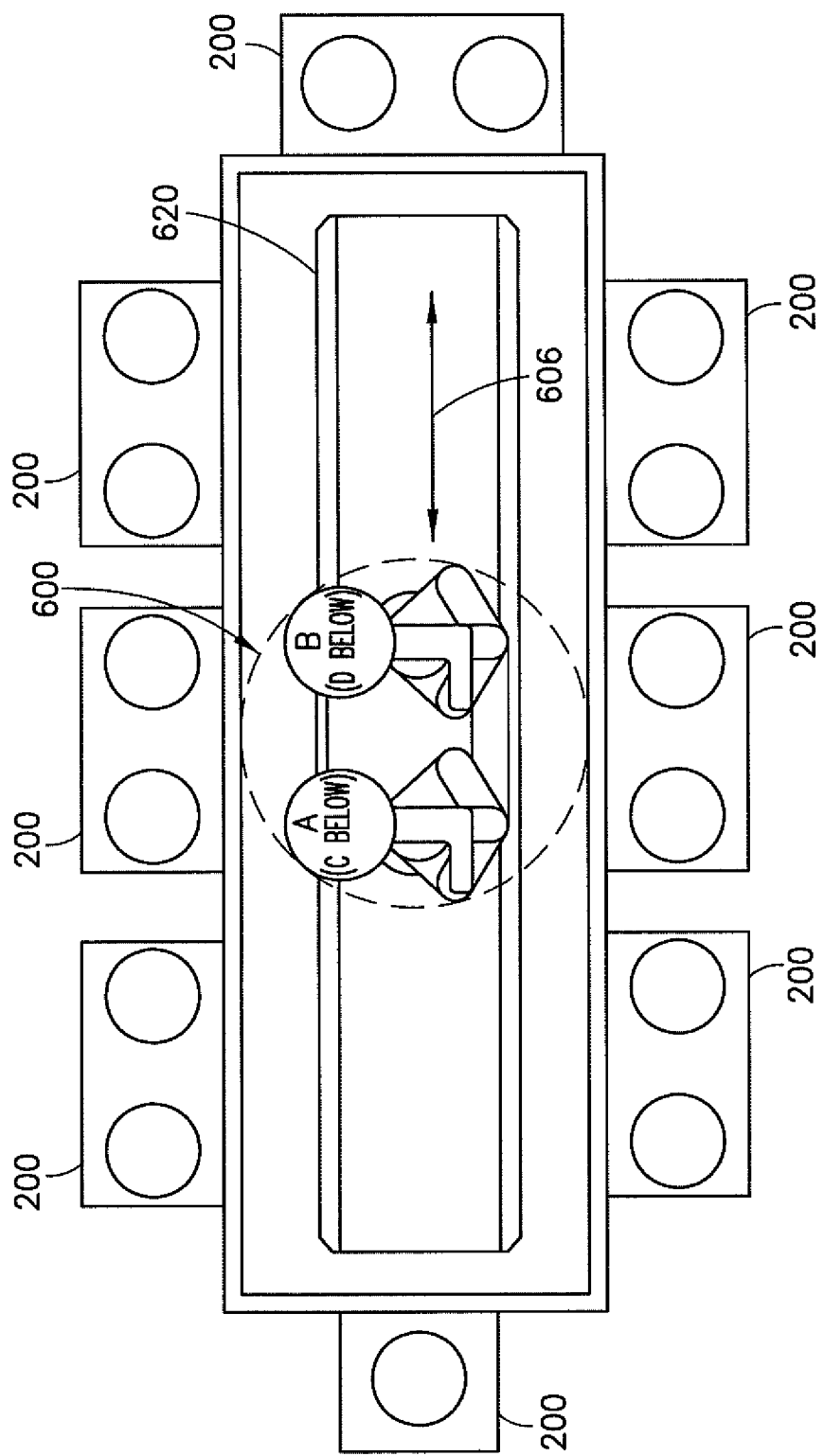
FIG. 6B is a diagrammatic view of another workstation environment and motion path for the robot of FIG. 6A.

Another example embodiment is depicted diagrammatically in FIGS. 6A and 6B. FIG. 6A shows a side view of an example robot 600, which includes or is associated with a controller 625, the robot 600 comprising a robot arm 615 coupled to a traversing platform 610 that traverses a stationary base 620, and FIG. 6B shows a top view of a motion path 606 of the robot 600. The robot 600 also includes a drive 612 to effect movements of the robot 600. As depicted diagrammatically in FIGS. 6A and 6B, the first linkage 650 may again comprise a first link 653 (first upper arm) coupled to a pivoting base 645 (common upper arm) via a rotary joint, a second link 655 (first forearm) coupled to the first link 653 via a rotary joint, and a third link 657 (first wrist) coupled to the second link 655 via a rotary joint. The first link 653 may be driven directly by a first motor located in the pivoting base 645, the second link 655 may be coupled through a belt, band, or cable drive to a second motor located in the pivoting base 645, and the third link 657 may be constrained via a belt, band, or cable drive to a point radially (with respect to the rotary joint) between the first link 653 and the pivoting base 645. The third link 657 may have an end-effector (end-effector A) configured to carry a payload, such as a semiconductor wafer.

In addition, the first linkage 650 may include a second upper arm 653a coupled to the pivoting base 645 via a rotary joint, a second forearm 655a coupled to the second upper arm 653a via a rotary joint, and a second wrist 657a coupled to the second forearm 655a via a rotary joint. The second upper arm 653a may be driven directly by a third motor located in the pivoting base 645, the second forearm 655a may be coupled through a belt, band, or cable drive to the second motor located in the pivoting base 645, and the second wrist 657a may be constrained via a belt, band, or cable drive to a point radially (with respect the rotary joint) between the second upper arm 653a and the pivoting base 645. The second wrist 657a may have an end-effector (end-effector C) configured to carry a payload, such as a semiconductor wafer.

The second linkage 652 may be a mirror image of the first linkage 650. The end-effector associated with a first wrist 671 of the second linkage 650 may be referred to as end-effector B, and the end-effector associated with a second wrist 673 of the second linkage 650 may be referred to as end-effector D.

Robot 600 may also exhibit a distributed actuator architecture with actuators or motors effecting the movement of the linkages or various links being located directly in or on the linkages or links themselves.

Figure 7A:
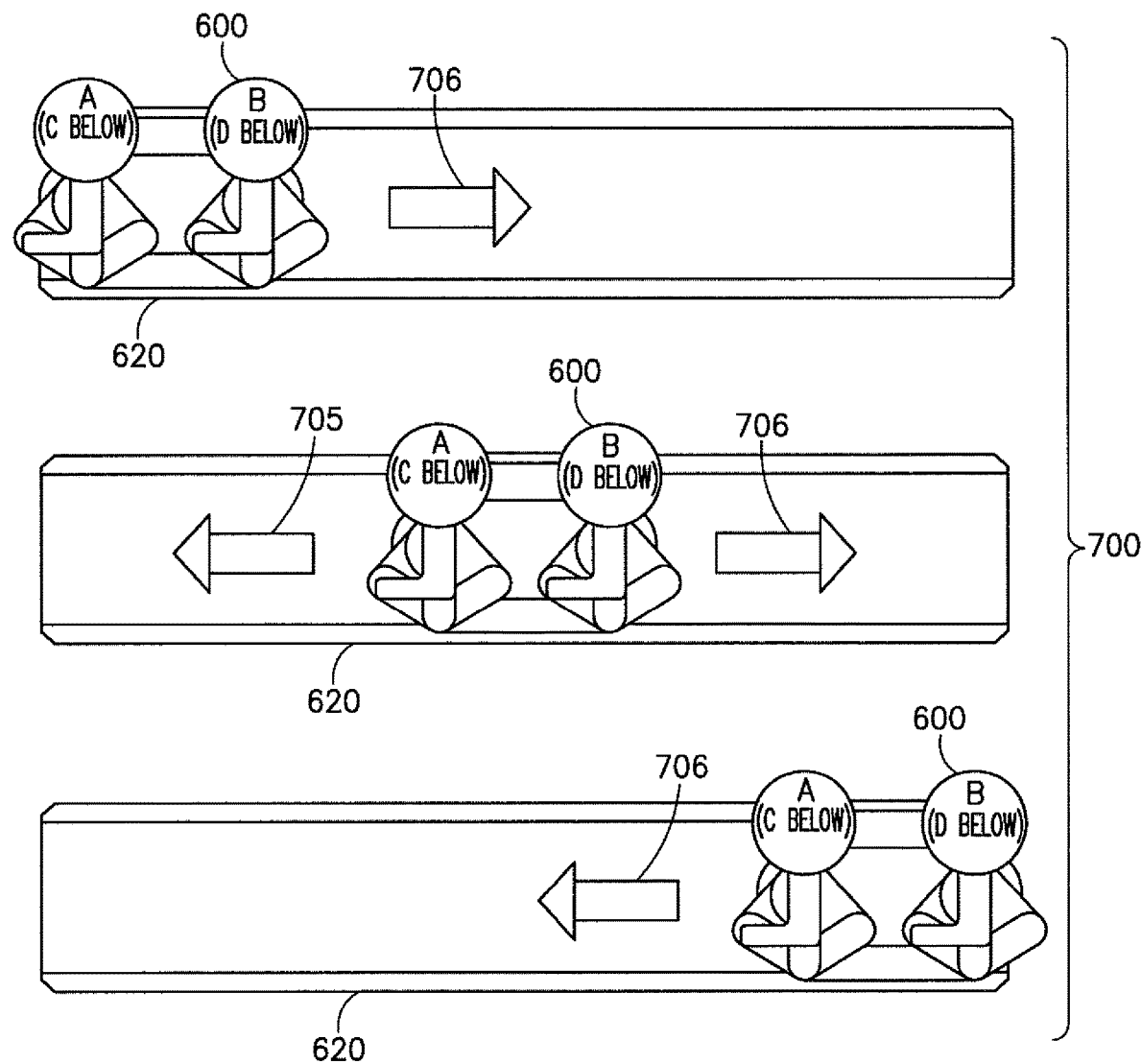
FIG. 7A is a diagrammatic view of the example robot of FIG. 6A operating in linear motion paths.
Figure 7B:
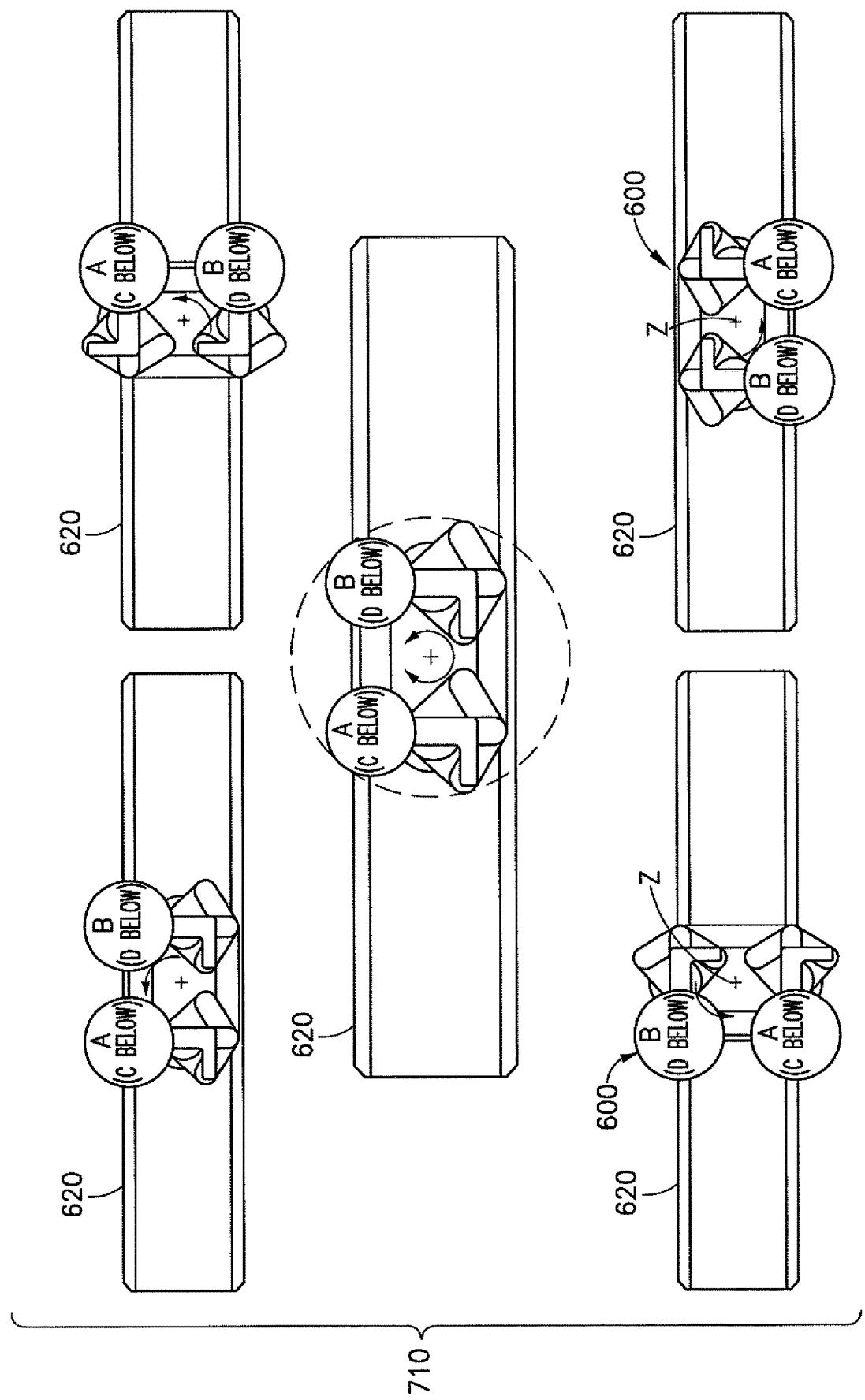
FIGS. 7B-7E are diagrammatic views of example operations of the robot of FIG. 6A.
Figure 7C:
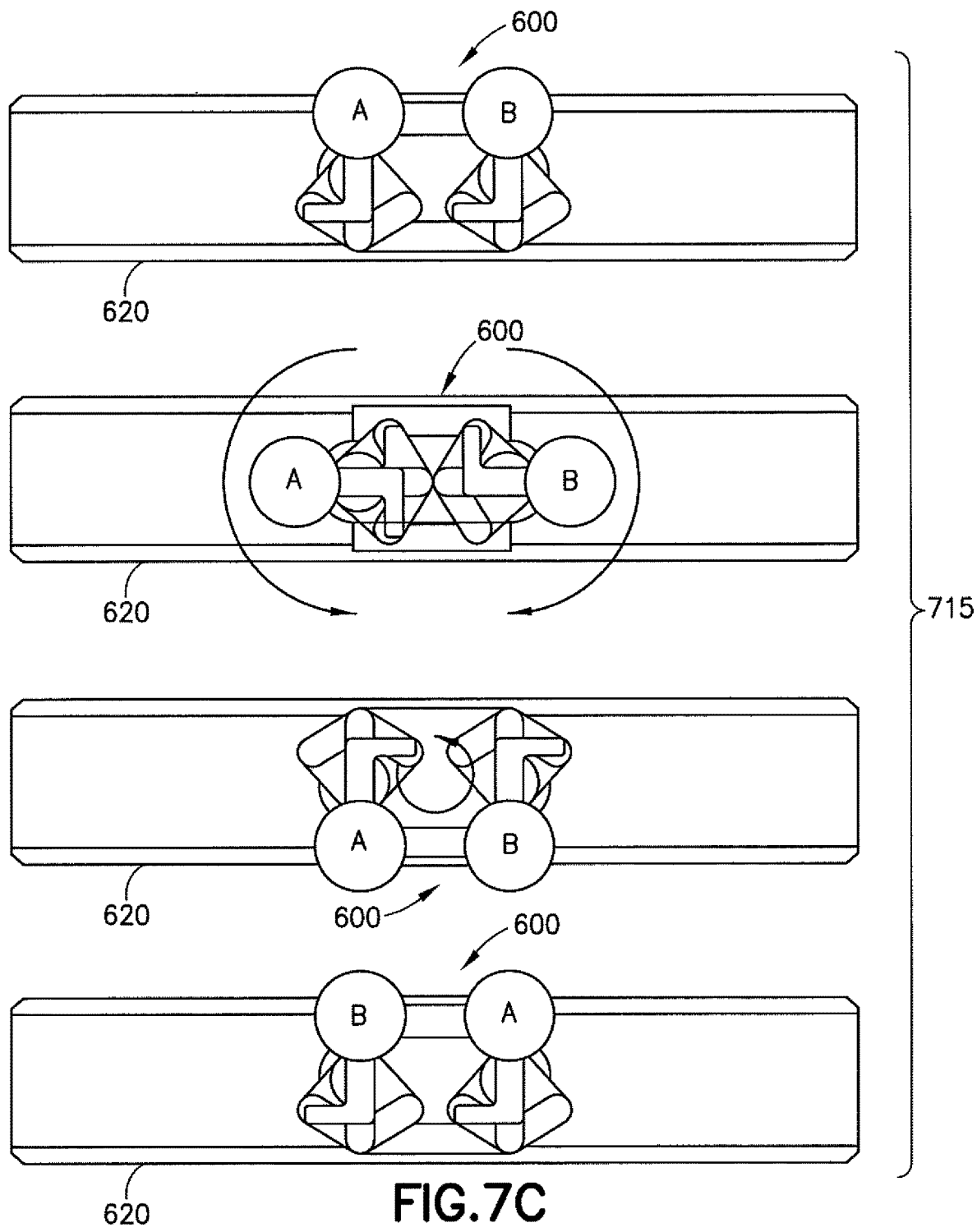
Figure 7D:
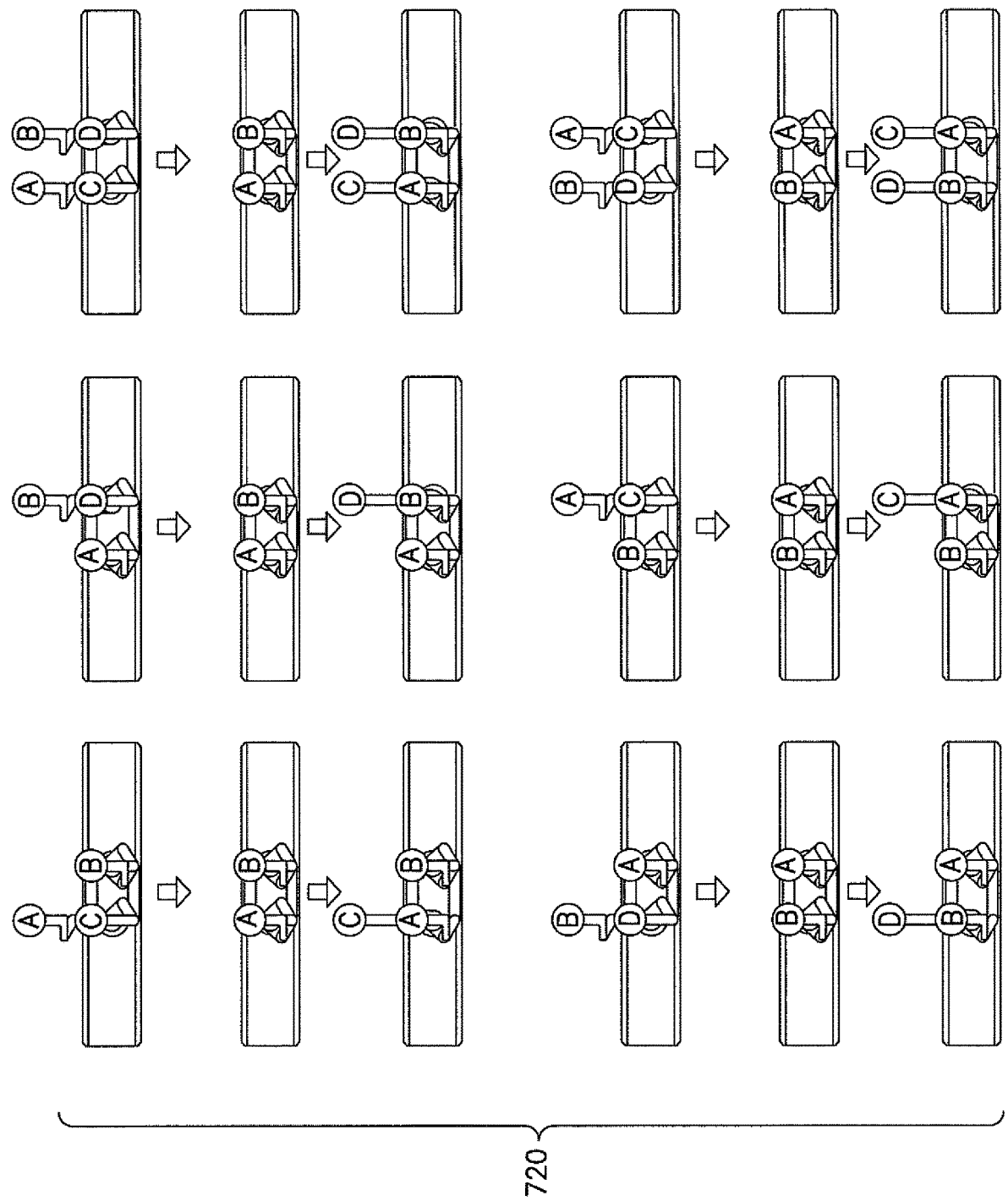
Figure 7E:
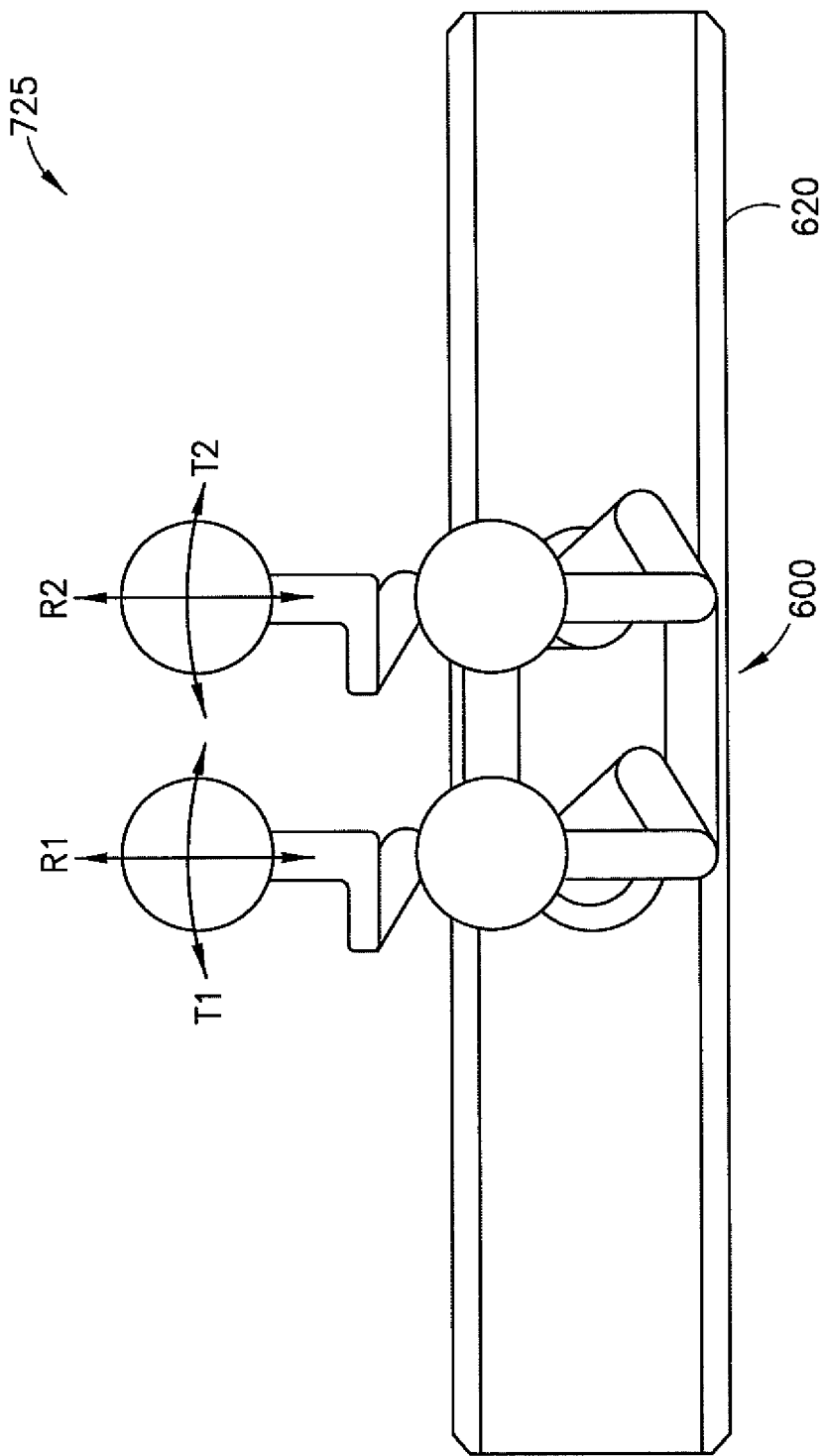

The operation of the example robot 600 of FIGS. 6A and 6B is illustrated diagrammatically in FIGS. 7A-7E. FIG. 7A shows, at 700, traversing motion of the robot 600 in linear directions along a motion path 706. FIG. 7B, at 710, shows rotational motion of the robot arm 615 in various directions about a point Z. FIG. 7C, at 715, shows a transition of end-effectors A and C from left to right accompanied by transition of end-effectors B and D from right to left. FIG. 7D, at 720, shows how the robot 600 may extend and retract various end-effectors independently and simultaneously (not all possible combinations are shown). FIG. 7E, at 725, shows how the robot 600 may compensate simultaneously for misalignment of wafers when the wafers are being delivered to a pair of workstations 200. As shown in FIG. 7E, at least one of the end-effectors may be L-shaped or at least angled. U.S. Pat. No. 9,149,936, which is hereby incorporated by reference in its entirety, also shows angled or L-shaped end effectors as part of robot arms, each having two links connected in series.

To summarize the operations in the examples above, the example robot 600 of FIG. 6A may extend end-effector A to a left workstation independently, extend end-effector B to a right station independently, extend end-effector A to a left station and end-effector B to a right station simultaneously, extend end-effector C to a left workstation independently, extend end-effector D to a right station independently, extend end-effectors C to a left station and end-effector D to a right station simultaneously, extend end-effectors A and C to a left station simultaneously, extend end-effectors B and D to a right station simultaneously, extend end-effectors A and C to a left station and end-effectors B a D to a right station simultaneously, extend end-effector A to a right station independently, extend end-effector B to a left station independently, extend end-effectors A to a right station and end-effector B to a left station simultaneously, extend end-effector C to a right workstation independently, extend end-effector D to a left workstation independently, extend end-effector C to a right workstation and end-effector D to a left workstation simultaneously, extend end-effectors A and C to a right station simultaneously, extend end-effectors B and D to a left station simultaneously, and extend end-effectors A and C to a right station and end-effectors B and D to a left station simultaneously.

Similar to the example robot 500 of FIG. 5, the capability of accessing left and right stations with either of the two end-effectors may be conveniently utilized to move wafers from left workstations to right workstations and vice versa should the recipe and wafer flow require such movement.

In addition, similar to the example embodiment of FIG. 5, the example robot 600 of FIG. 6A can pick and place wafers from and to left and right stations simultaneously. Furthermore, the capability of positioning the two end-effectors of the robot arm 615 independently may be conveniently utilized to compensate for misalignment of a wafer on one end-effector and, simultaneously, compensate for misalignment of a wafer on the other end-effector when the wafers are being delivered simultaneously to a pair of workstations. These capabilities may result in improved productivity (number of wafer processes per unit time).

Although the traversing robot with multiple end-effectors according to the present invention is described with respect to the examples of FIGS. 1A-7E, any suitable linkages may be utilized. For example, each of the first and second linkages may be in the form of one of the following mechanical arrangements: a first link and a second link coupled to the first link via a rotary joint, the second link having an end-effector; a first link and two second links coupled to the first link via substantially coaxial rotary joints, each of the second links having an end-effector; or two rigidly connected first links, each first link supporting a second link via a rotary joint, each second link having an end-effector.

In addition, variations of the example robots are contemplated in which a single link includes three end-effectors; a hub, pivoting base, or common upper arm includes two switchblade arms; a hub, pivoting base, or common upper arm includes two dual switchblade arms; a hub, pivoting base, or common upper arm includes butterfly arms; a robot drive includes a linkage-based Z axis; a robot drive has no Z axis; a robot has rotary thermal couplings or other types of thermal couplings; and a robot includes fins in a Z axis direction.

Figure 8:
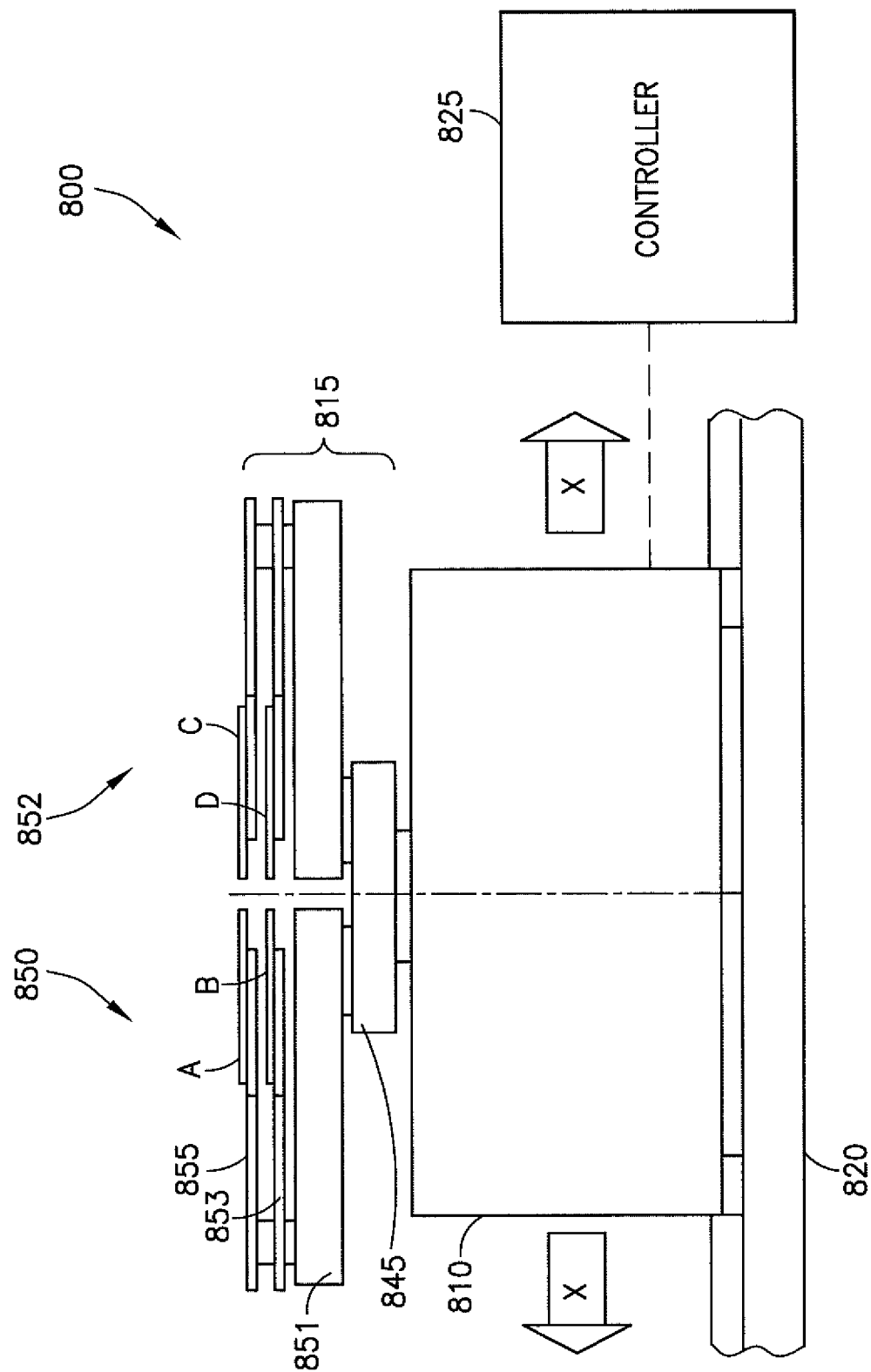

In another example embodiment as depicted diagrammatically in FIG. 8, a robot 800, which includes or is associated with a controller 825, comprises a drive (similar to the example embodiments above) and a traversing platform 810 that traverses a stationary base 820. A robot arm 815 on the traversing platform 810 includes a pivoting base 845 (common upper arm) having a first linkage 850 (first forearm) and a second linkage 852 (second forearm) (switchblade arms), each having an end-effector configured to carry a payload such as a wafer. The first linkage 850 includes a first link 851 coupled to the pivoting base 845 via a rotary joint. The first linkage 850 also includes a first wrist 853 and a second wrist 855 coupled to the first link 851 along the same axis. Each of the first wrist 853 and the second wrist 855 include respective end-effectors A, B. The first link 851 may be driven directly by a motor located in the pivoting base 845 (and/or in the first link 851), and the first wrist 853 and the second wrist 855 may each be driven through a belt, band, or cable drive by another motor located in the pivoting base 845. The second linkage 852 is a mirror image of the first linkage 850 and includes end-effectors C, D and is driven similar to the first linkage 850.

Figure 9:
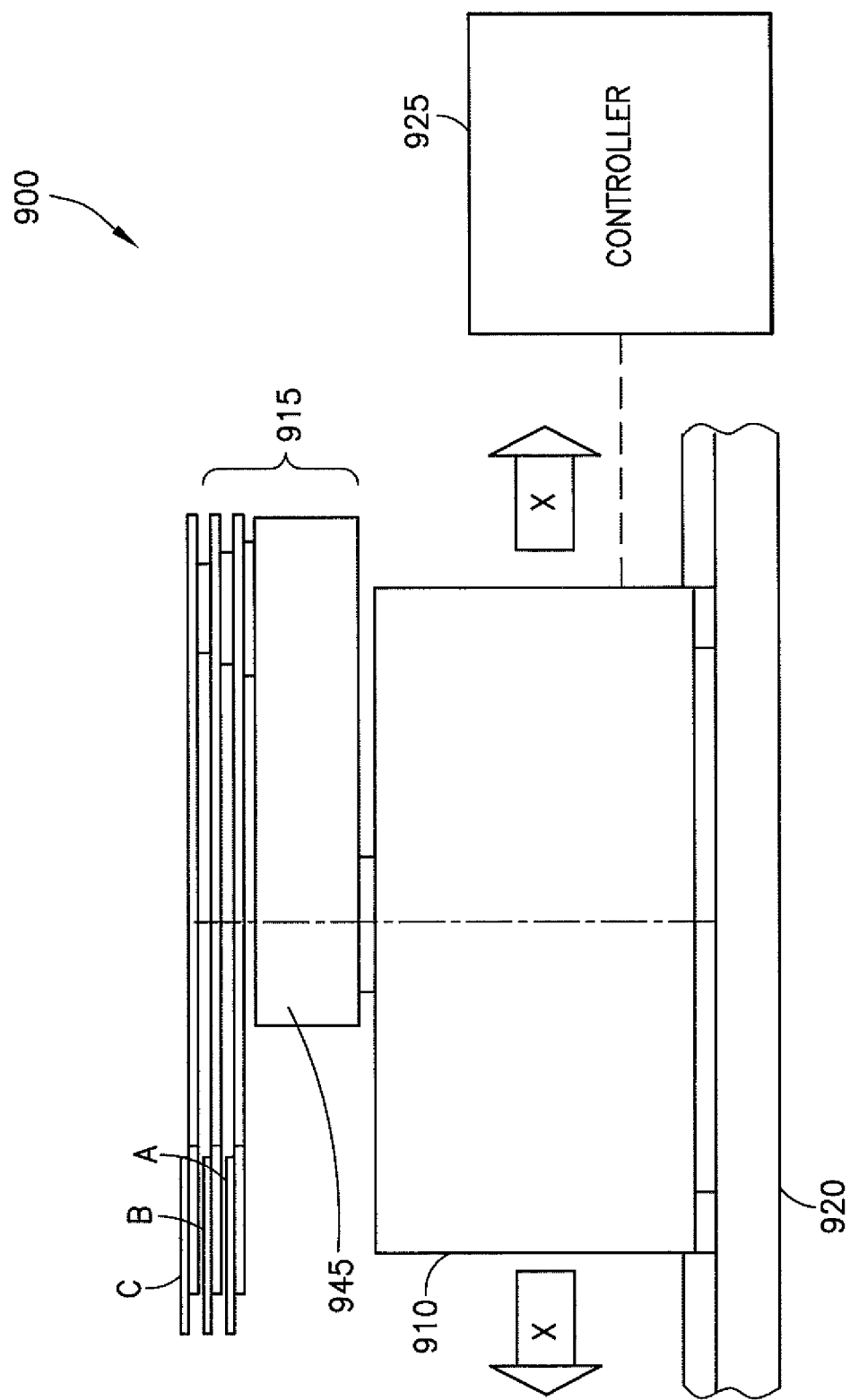

In another example embodiment, as depicted diagrammatically in FIG. 9, a robot 900 (with an associated drive), which includes or is associated with a controller 925, comprises multiple end-effectors, each having a respective link. As shown, the robot has three links and three end-effectors each configured to carry a payload such as a semiconductor wafer. Robot 900 comprises a traversing platform 910 that traverses a stationary base 920. A robot arm 915 on the traversing platform 910 includes a pivoting base 945 (common upper arm) having a first linkage 950 (first forearm), a second linkage 952 (second forearm), and a third linkage 954 (third forearm). Each of the first linkage 950, the second linkage 952, and the third linkage 954 includes a respective end-effector A, B, C. Each of the first linkage 950, the second linkage 952, and the third linkage 954 coupled to the pivoting base 945 through rotary joints arranged, for example, in a substantially coaxial manner, and are driven directly by motor(s) in the pivoting base 945.

Figure 10:
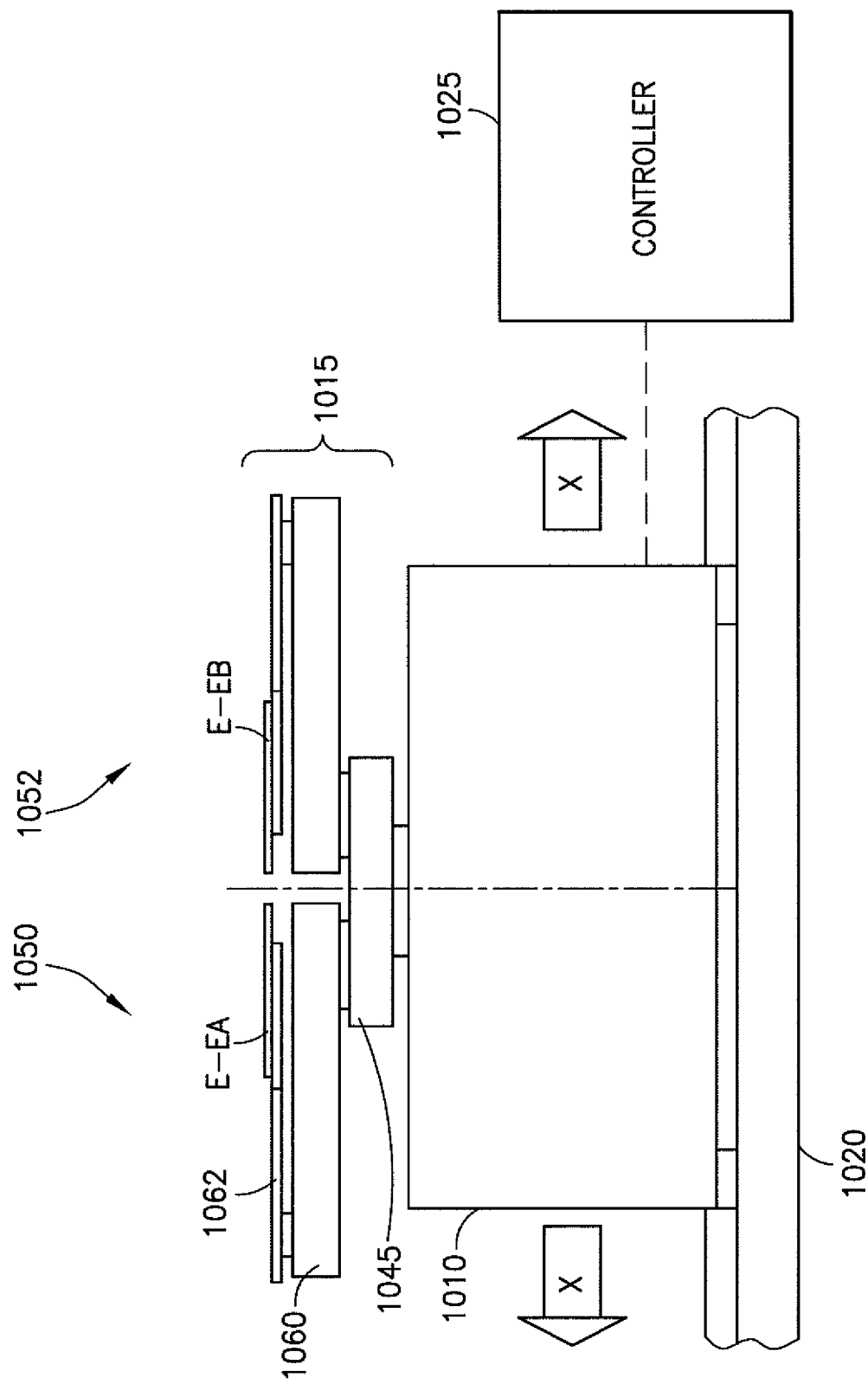
FIG. 10 is a schematic representation of internal components of the traversing robot of FIG. 1A.

In another example embodiment, as depicted diagrammatically in FIG. 10, a robot 1000, which includes or is associated with a controller 1025, has two butterfly arms. Robot 1000 comprises a traversing platform 1010 that traverses a stationary base 1020. A robot arm 1015 on the traversing platform 1010 includes a pivoting base 1045 (common upper arm) having a first linkage 1050 (first forearm) and a second linkage 1052 (second forearm). The first linkage 1050 includes a first link 1060 coupled to the pivoting base 1045. The first linkage 1050 also includes a first end of a second link 1062 coupled to a first end of the first link 1060. An end portion of the second link 1062 has an end-effector A. The second linkage 1052 is a mirror image of the first linkage 1050 and includes end-effectors B and is driven similar to the first linkage 1050. Actuators or motors may be distributed on or in one or more of the pivoting base 1045, the first link 1060, or the link corresponding to first link 1060 in the second linkage 1052.

Figure 11:
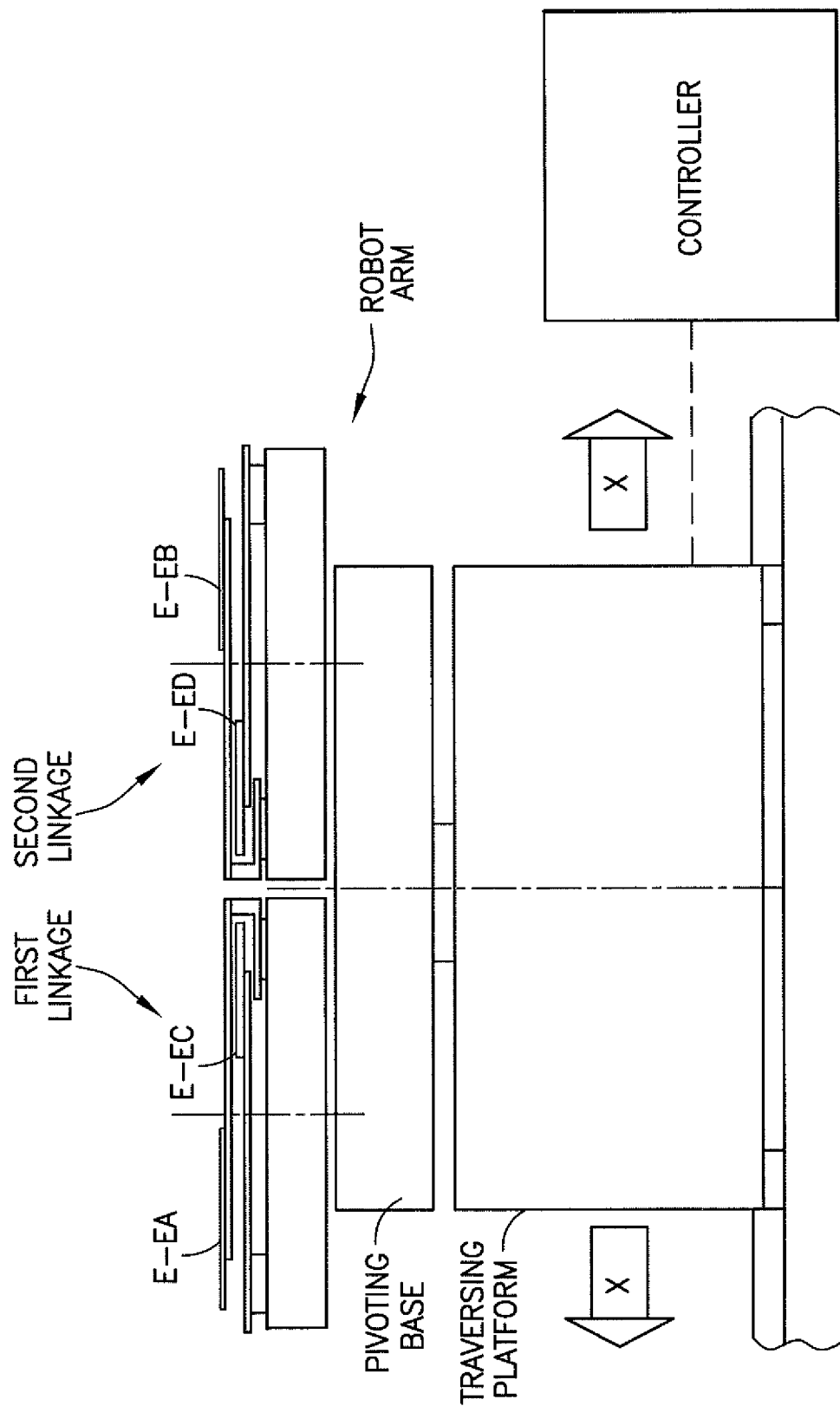

As another example, as illustrated in FIG. 11, the first and second linkages may each comprise two rigidly connected first links, each first link supporting a second link via a rotary joint, each second link having an end-effector configured to carry a payload, such as a semiconductor wafer.

Figure 12:
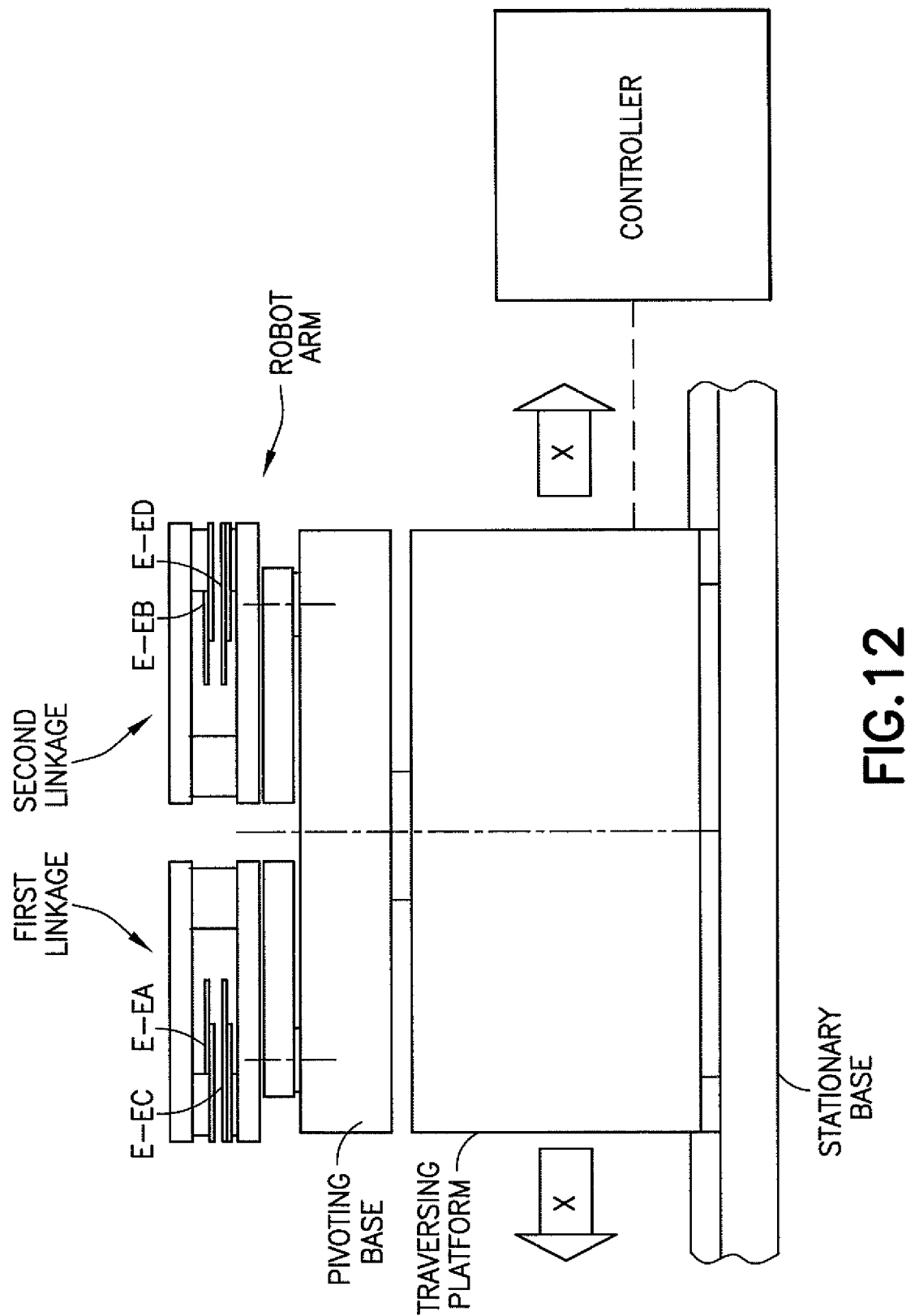

As yet another example, as illustrated diagrammatically in FIG. 12, the first and second linkages may each comprise a first link, two second links coupled to the first link, for example, via substantially coaxial rotary joints, and two third links, each of the third links coupled to the corresponding second link via a rotary joint. Each of the third links may feature an end-effector configured to carry a payload such as a semiconductor wafer. The motion of each of the third links may be mechanically constrained, for example, by a belt, band, or cable arrangement, to depend on the motion of the corresponding second link and the first link.

Figure 13:
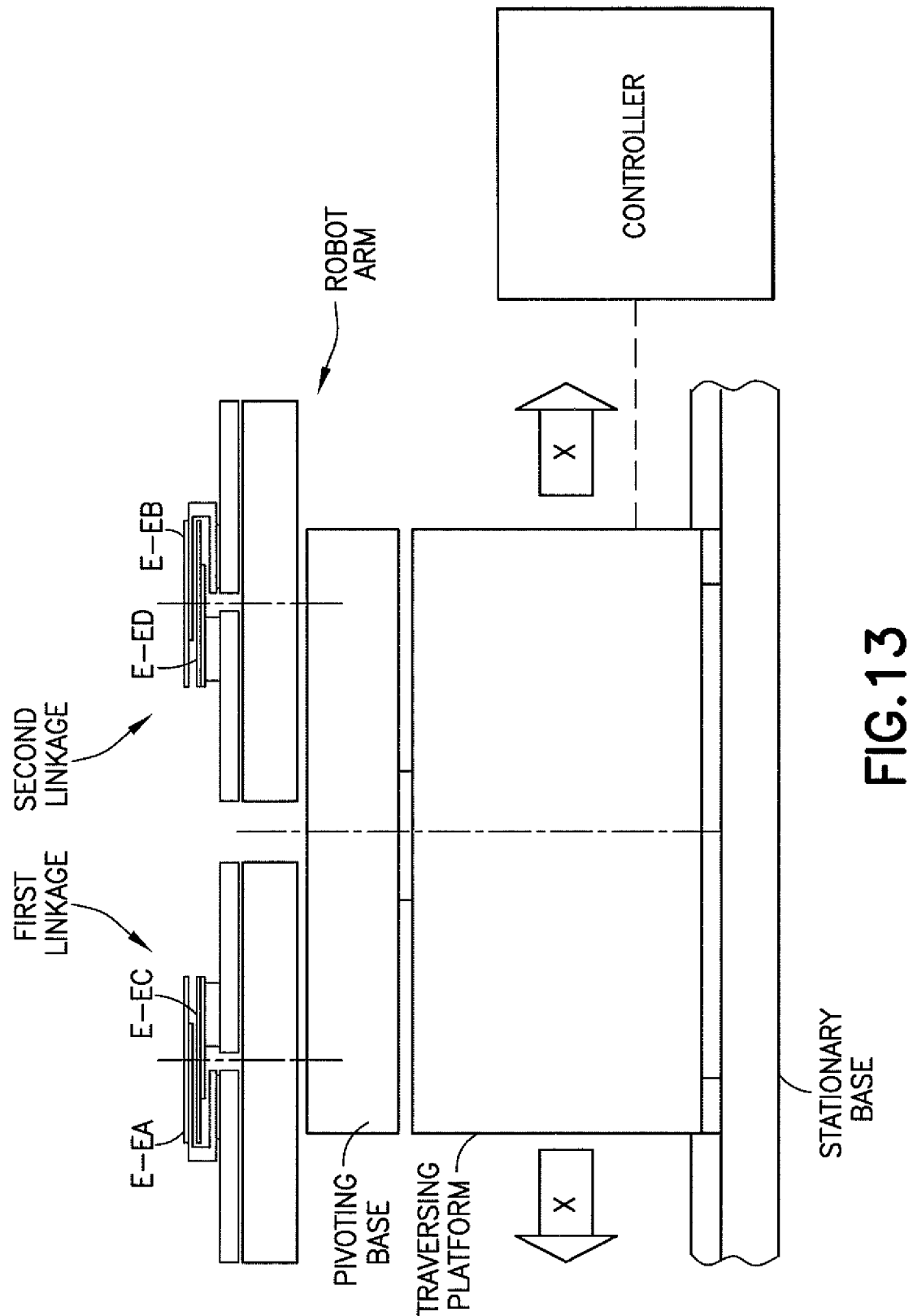

As another example, as illustrated diagrammatically in FIG. 13, the first and second linkages may each comprise two rigidly connected first links, two second links, each of the second links coupled to the corresponding first link via a rotary joint, and two third links, each of the third links coupled to the corresponding second link via a rotary joint. Each of the third links may feature an end-effector configured to carry a payload, such as a semiconductor wafer. The motion of each of the third links may be mechanically constrained, for example, by a belt, band, or cable arrangement, to depend on the motion of the corresponding first and second links.

Although the description of the example internal arrangements of the traversing robot with multiple end-effectors according to the present invention indicates that the motors that actuate the links of the robot arm may be located inside of the robot arm, for example, integrated into the pivoting platform or pivoting base, the motors that actuate the links of the robot arm may be located in the spindle, and a system of shafts, pulleys, belts, bands, and/or cables may be utilized to couple the links to the motors. Alternatively, any suitable combination of motors in the robot arm and motors in the spindle may be used to actuate the links of the robot arm.

As indicate earlier, the traversing platform in any embodiment may include a vertical lift mechanism, for example, comprising one or more linear rail-bearing arrangements and a motor-driven ball screw, configured to lift the spindle (also referred to as the spindle platform) up or down in the vertical direction.

Figure 14:
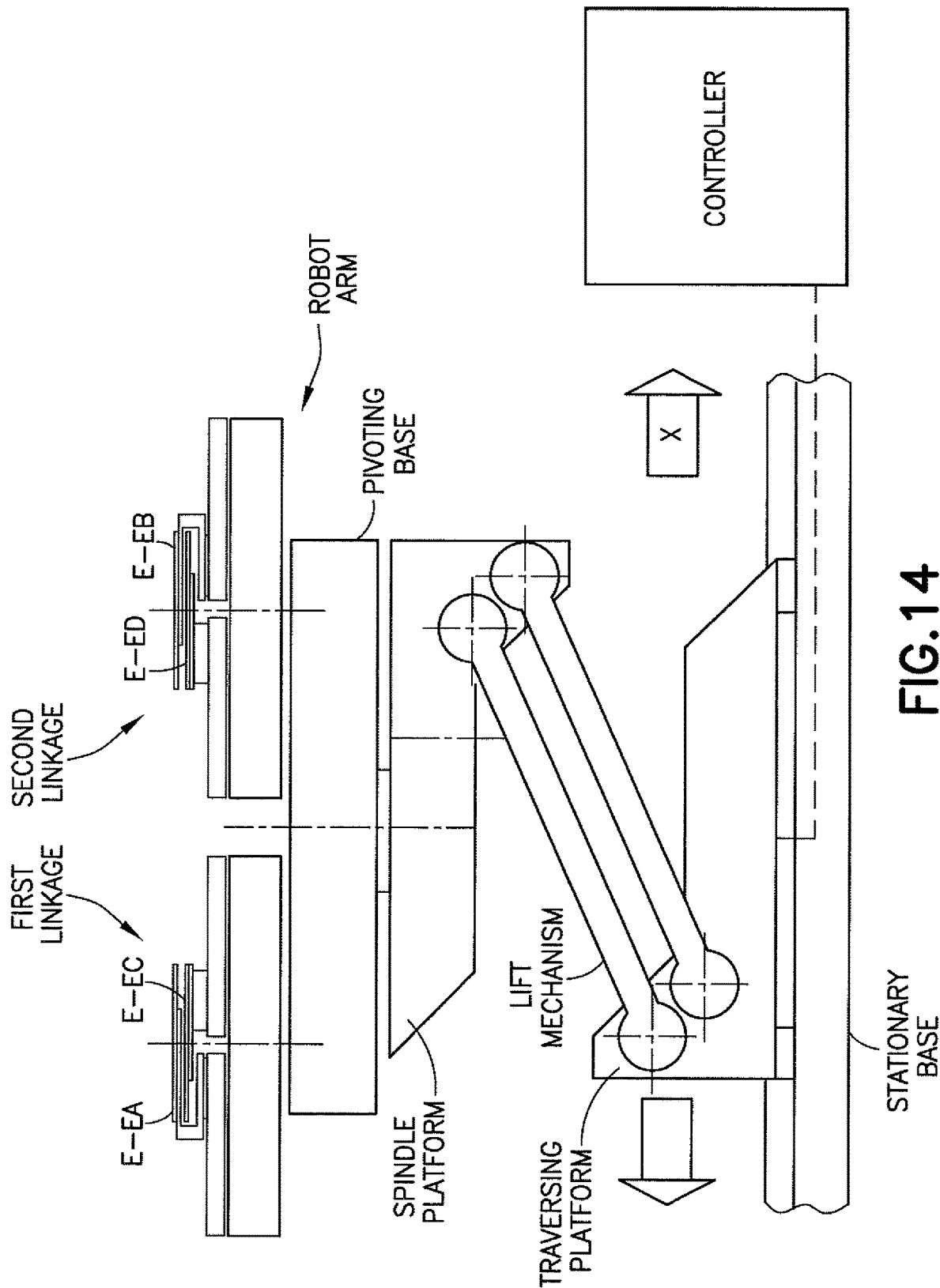

As another example, the lift mechanism may comprise one or more lift linkages configured to move the spindle platform relative to the traversing platform in the vertical direction (or, more specifically, in a manner that includes a vertical motion component) and to stabilize the angular orientation of the spindle platform (for example, to keep the spindle platform substantially leveled). For example, as illustrated in FIG. 14, the lift linkage may comprise a parallelogram arrangement of bars, supports, struts, or other structure, the lift linkage being actuated by a rotary drive. The rotary drive may include a rotary motor and a rotary sensor.

In general, each of the one or more linkages of the lift mechanism may comprise one or more links, joints (of a rotary type or another suitable type) and/or pulley arrangements utilizing belts, bands, or cables. The one or more linkages may be actuated by one or more rotary motors, linear motors, struts, or by any other suitable actuation means.

The one or more linkages of the lift mechanism may be arranged on one or both sides of the traversing platform. As another example, the one or more linkages may be arranged on one or both faces of the traversing platform. Alternatively, the one or more linkages may be arranged in any suitable location on the traversing platform.

Additional examples and details of suitable linkage-based lift mechanisms are possible. It should be noted that embodiments in which no vertical lift may be present are within the scope of the present invention.

Features as described herein may be provided in an apparatus. Features as described herein may be provided in a method of assembly for assembling an apparatus. Features as described herein may be provided in a method of using an apparatus with features as described above. Features as described herein may be provided in control software, embodied in a memory and capable of use with a processor, or controlling an apparatus with movement as described above.

In one example embodiment, an apparatus comprises a platform configured to traverse a stationary base along a motion path; a drive coupled to the platform; and a movable arm assembly. The movable arm assembly comprises a pivoting base connected to the drive, a first linkage connected to the pivoting base, and a second linkage connected to the pivoting base. The first linkage comprises a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. The second linkage comprises a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The platform is configured to traverse the stationary base along a motion path in two opposing directions and the drive and the movable arm assembly are configured to cause independent and simultaneous movement and transfer of substrates from at least one of the first substrate holding area, the second substrate holding area, the third substrate holding area, or the fourth substrate holding area into or from a respective substrate workstation. At least one motor for moving at least one of the first linkage or the second linkage is located in at least one of the pivoting base, the first linkage, or the second linkage.

The pivoting base may be configured to be rotatable about the drive at a point that is substantially at a geometric center of the pivoting base. The first upper link may be configured to be rotatable on the pivoting base through the first rotary joint and the first lower link may be configured to be rotatable on the pivoting base through the second rotary joint such that a position of the first end-effector and a position of the second end-effector are reversed relative to the pivoting base. The second upper link may be configured to be rotatable on the pivoting base through the third rotary joint and the second lower link may be configured to be rotatable on the pivoting base through the fourth rotary joint such that a position of the third end-effector and a position of the fourth end-effector are reversed relative to the pivoting base. The pivoting base may be configured to be rotatable simultaneously with an extension of at least one of the first end-effector, the second end-effector, the third end-effector, or the fourth end-effector to the respective substrate workstation. The pivoting base may be configured to be rotatable simultaneously with a simultaneous extension of the first end-effector to a first of the respective substrate workstations and the second end-effector to a second of the respective substrate workstations. The first upper link may comprise a first upper arm coupled to the pivoting base, a first forearm coupled to the first upper arm, and a first wrist on which the first end-effector is mounted. The first lower link may comprise a second upper arm coupled to the pivoting base, a second forearm coupled to the second upper arm, and a second wrist on which the second end-effector is mounted. The second upper link may comprise a third upper arm coupled to the pivoting base, a third forearm coupled to the third upper arm, and a third wrist on which the third end-effector is mounted. The second lower link may comprise a fourth upper arm coupled to the pivoting base, a fourth forearm coupled to the fourth upper arm, and a fourth wrist on which the fourth end-effector is mounted. The second upper arm coupled to the pivoting base may be coaxial with the first upper arm, and the fourth upper arm coupled to the pivoting base may be coaxial with the third upper arm. At least one of the first end-effector, the second end-effector, the third end-effector, or the fourth end-effector may be angled. At least one movement of at least one of the first upper link, the first lower link, the second upper link, or the second lower link may be configured to compensate for a misalignment of the movement and transfer of the substrates into the respective substrate workstation.

In another example embodiment, a method comprises providing a platform configured to traverse a stationary base along a motion path; providing a drive coupled to the platform; and connecting a pivoting base of a movable arm assembly to the drive. A first linkage of the mobile arm assembly is connected to the pivoting base and comprises a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. A second linkage of the mobile arm assembly is connected to the pivoting base and comprises a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The platform is configured to traverse the stationary base along a motion path in two opposing directions and the drive and the movable arm assembly are configured to cause independent and simultaneous movement and transfer of substrates from at least one of the first substrate holding area, the second substrate holding area, the third substrate holding area, or the fourth substrate holding area into a respective substrate workstation.

The pivoting base may be configured to be rotatable about the drive at a point that is substantially at a geometric center of the pivoting base. The first upper link may be configured to be rotatable on the pivoting base through the first rotary joint and the first lower link may be configured to be rotatable on the pivoting base through the second rotary joint such that a position of the first end-effector and a position of the second end-effector are reversed relative to the pivoting base. The second upper link may be configured to be rotatable on the pivoting base through the third rotary joint and the second lower link may be configured to be rotatable on the pivoting base through the fourth rotary joint such that a position of the third end-effector and a position of the fourth end-effector are reversed relative to the pivoting base. The pivoting base may be configured to be rotatable simultaneously with an extension of at least one of the first end-effector, the second end-effector, the third end-effector, or the fourth end-effector to the respective substrate workstation. The pivoting base may be configured to be rotatable simultaneously with a simultaneous extension of the first end-effector to a first of the respective substrate workstations and the second end-effector to a second of the respective substrate workstations.

In another example embodiment, a method comprises placing a first substrate on a first substrate holding area of a first end-effector and placing a second substrate on a second substrate holding area of a second end-effector, wherein the first end-effector and the second end-effector form a portion of a movable arm assembly comprising a pivoting base connected to a drive, wherein the movable arm assembly further comprises a pivoting base connected to the drive, a first linkage connected to the pivoting base, the first linkage comprising a first upper link coupled to the pivoting base through a first rotary joint, the first upper link comprising a first end-effector having at least a first substrate holding area, and a first lower link coupled to the pivoting base through a second rotary joint, the first lower link comprising a second end-effector having at least a second substrate holding area, wherein the first rotary joint is substantially coaxial with the second rotary joint. A second linkage is connected to the pivoting base, the second linkage comprising a second upper link coupled to the pivoting base through a third rotary joint, the second upper link comprising a third end-effector having at least a third substrate holding area, and a second lower link coupled to the pivoting base through a fourth rotary joint, the second lower link comprising a fourth end-effector having at least a fourth substrate holding area, wherein the third rotary joint is substantially coaxial with the fourth rotary joint. The method also comprises moving the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into or from a respective substrate workstation.

Moving the platform and moving the drive and movable arm assembly may comprise rotating the pivoting base simultaneously with an extension of at least one of the first end-effector, the second end-effector, the third end-effector, or the fourth end-effector to the respective substrate workstation.

In another example embodiment, a non-transitory program storage device readable by a machine, tangibly embodying a program of instructions executable by the machine, comprises operations of placing a first substrate on a first substrate holding area of a first end-effector, placing a second substrate on a second substrate holding area of a second end-effector, placing a third substrate on a third substrate holding area of a third end-effector, and placing a fourth substrate on a fourth substrate holding area of a fourth end effector, wherein the first end-effector, the second end-effector, the third end-effector, and the fourth end-effector form a portion of a movable arm assembly comprising a pivoting base connected to a drive, wherein the movable arm assembly further comprises a pivoting base connected to the drive, a first linkage connected to the pivoting base, the first linkage comprising a first upper link coupled to the pivoting base through a first rotary joint, the first upper link comprising the first end-effector having at least the first substrate holding area, and a first lower link coupled to the pivoting base through a second rotary joint, the first lower link comprising the second end-effector having at least the second substrate holding area, wherein the first rotary joint is substantially coaxial with the second rotary joint, and a second linkage connected to the pivoting base, the second linkage comprising a second upper link coupled to the pivoting base through a third rotary joint, the second upper link comprising the third end-effector having at least the third substrate holding area, and a second lower link coupled to the pivoting base through a fourth rotary joint, the second lower link comprising the fourth end-effector having at least the fourth substrate holding area, wherein the third rotary joint is substantially coaxial with the fourth rotary joint. The operations also comprise controlling a movement of the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into a respective substrate workstation.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:
    a platform configured to traverse a stationary base along a motion path;
    a drive coupled to the platform; and
    a movable arm assembly, comprising,
        a pivoting base connected to the drive,
        a first linkage connected to the pivoting base, the first linkage comprising,
            a first upper link coupled to the pivoting base through a first rotary joint, the first upper link comprising a first end-effector having at least a first substrate holding area, and
            a first lower link coupled to the pivoting base through a second rotary joint, the first lower link comprising a second end-effector having at least a second substrate holding area,
            wherein the first rotary joint is substantially coaxial with the second rotary joint, and
        a second linkage connected to the pivoting base, the second linkage comprising,
            a second upper link coupled to the pivoting base through a third rotary joint, the second upper link comprising a third end-effector having at least a third substrate holding area, and
            a second lower link coupled to the pivoting base through a fourth rotary joint, the second lower link comprising a fourth end-effector having at least a fourth substrate holding area, wherein the third rotary joint is substantially coaxial with the fourth rotary joint;

wherein the platform is configured to traverse the stationary base along a motion path in two opposing directions and wherein the drive and the movable arm assembly are configured to cause independent and simultaneous movement and transfer of substrates from at least one of the first substrate holding area, the second substrate holding area, the third substrate holding area, or the fourth substrate holding area into or from a respective substrate workstation positioned along the motion path; and wherein at least one motor for moving at least one of the first linkage or the second linkage is located in at least one of the pivoting base, the first linkage, or the second linkage.

2. The apparatus of claim 1, wherein the pivoting base is configured to be rotatable about the drive at a point that is substantially at a geometric center of the pivoting base.

3. The apparatus of claim 1, wherein the first upper link is configured to be rotatable on the pivoting base through the first rotary joint and the first lower link is configured to be rotatable on the pivoting base through the second rotary joint such that a position of the first end-effector and a position of the second end-effector are reversed relative to the pivoting base.

4. The apparatus of claim 3, wherein the second upper link is configured to be rotatable on the pivoting base through the third rotary joint and the second lower link is configured to be rotatable on the pivoting base through the fourth rotary joint such that a position of the third end-effector and a position of the fourth end-effector are reversed relative to the pivoting base.

5. The apparatus of claim 1, wherein the pivoting base is configured to be rotatable simultaneously with an extension of at least one of the first end-effector, the second end-effector, the third end-effector, or the fourth end-effector to the respective substrate workstation.

6. The apparatus of 5, wherein the pivoting base is configured to be rotatable simultaneously with a simultaneous extension of the first end-effector to a first of the respective substrate workstations and the second end-effector to a second of the respective substrate workstations.

7. The apparatus of claim 1,
wherein the first upper link comprises a first upper arm coupled to the pivoting base, a first forearm coupled to the first upper arm, and a first wrist on which the first end-effector is mounted,
wherein the first lower link comprises a second upper arm coupled to the pivoting base, a second forearm coupled to the second upper arm, and a second wrist on which the second end-effector is mounted,
wherein the second upper link comprises a third upper arm coupled to the pivoting base, a third forearm coupled to the third upper arm, and a third wrist on which the third end-effector is mounted, and
wherein the second lower link comprises a fourth upper arm coupled to the pivoting base, a fourth forearm coupled to the fourth upper arm, and a fourth wrist on which the fourth end-effector is mounted.

8. The apparatus of claim 7, wherein the second upper arm coupled to the pivoting base is coaxial with the first upper arm, and wherein the fourth upper arm coupled to the pivoting base is coaxial with the third upper arm.

9. The apparatus of claim 8, wherein at least one of the first end-effector, the second end-effector, the third end-effector, or the fourth end-effector is angled.

10. The apparatus of claim 9, wherein at least one movement of at least one of the first upper link, the first lower link, the second upper link, or the second lower link is configured to compensate for a misalignment of the movement and transfer of the substrates into the respective substrate workstation.

11. The apparatus of claim 1, wherein the drive and the movable arm assembly are configured to cause movement and transfer of a substrate from a first substrate workstation on a first side of the motion path to a second substrate workstation on a second side of the motion path.

12. A method, comprising,
providing a platform configured to traverse a stationary base along a motion path;
providing a drive coupled to the platform; and
connecting a pivoting base of a movable arm assembly to the drive,
wherein a first linkage of the mobile arm assembly is connected to the pivoting base comprises,
a first upper link coupled to the pivoting base through a first rotary joint, the first upper link comprising a first end-effector having at least a first substrate holding area, and
a first lower link coupled to the pivoting base through a second rotary joint, the first lower link comprising a second end-effector having at least a second substrate holding area,
wherein the first rotary joint is substantially coaxial with the second rotary joint, and
wherein a second linkage of the mobile arm assembly is connected to the pivoting base, the second linkage comprising,
a second upper link coupled to the pivoting base through a third rotary joint, the second upper link comprising a third end-effector having at least a third substrate holding area, and
a second lower link coupled to the pivoting base through a fourth rotary joint, the second lower link comprising a fourth end-effector having at least a fourth substrate holding area,
wherein the third rotary joint is substantially coaxial with the fourth rotary joint; and
wherein the platform is configured to traverse the stationary base along a motion path in two opposing directions and wherein the drive and the movable arm assembly are configured to cause independent and simultaneous movement and transfer of substrates from at least one of the first substrate holding area, the second substrate holding area, the third substrate holding area, or the fourth substrate holding area into a respective substrate workstation;
wherein at least one motor for moving at least one of the first linkage or the second linkage is located in at least one of the pivoting base, the first linkage, or the second linkage.

13. The method of claim 12, wherein the pivoting base is configured to be rotatable about the drive at a point that is substantially at a geometric center of the pivoting base.

14. The method of claim 12, wherein the first upper link is configured to be rotatable on the pivoting base through the first rotary joint and the first lower link is configured to be rotatable on the pivoting base through the second rotary joint such that a position of the first end-effector and a position of the second end-effector are reversed relative to the pivoting base.

15. The method of claim 14, wherein the second upper link is configured to be rotatable on the pivoting base through the third rotary joint and the second lower link is configured to be rotatable on the pivoting base through the fourth rotary joint such that a position of the third end-effector and a position of the fourth end-effector are reversed relative to the pivoting base.

16. The method of claim 12, wherein the pivoting base is configured to be rotatable simultaneously with an extension of at least one of the first end-effector, the second end-effector, the third end-effector, or the fourth end-effector to the respective substrate workstation.

17. The method of claim 16, wherein the pivoting base is configured to be rotatable simultaneously with a simultaneous extension of the first end-effector to a first of the respective substrate workstations and the second end-effector to a second of the respective substrate workstations.

18. A method, comprising:
 placing a first substrate on a first substrate holding area of a first end-effector and placing a second substrate on a second substrate holding area of a second end-effector, wherein the first end-effector and the second end-effector form a portion of a movable arm assembly comprising a pivoting base connected to a drive, wherein the movable arm assembly further comprises,
  a pivoting base connected to the drive,
  a first linkage connected to the pivoting base, the first linkage comprising,
   a first upper link coupled to the pivoting base through a first rotary joint, the first upper link comprising a first end-effector having at least a first substrate holding area, and
   a first lower link coupled to the pivoting base through a second rotary joint, the first lower link comprising a second end-effector having at least a second substrate holding area,
  wherein the first rotary joint is substantially coaxial with the second rotary joint, and
  a second linkage connected to the pivoting base, the second linkage comprising,
   a second upper link coupled to the pivoting base through a third rotary joint, the second upper link comprising a third end-effector having at least a third substrate holding area, and
   a second lower link coupled to the pivoting base through a fourth rotary joint, the second lower link comprising a fourth end-effector having at least a fourth substrate holding area,
  wherein the third rotary joint is substantially coaxial with the fourth rotary joint; and
 moving the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into or from a respective substrate workstation; and
 moving the movable arm assembly using at least one motor located in at least one of the pivoting base, the first linkage, or the second linkage.

19. The method of claim 18, wherein moving the platform and moving the drive and movable arm assembly comprises rotating the pivoting base simultaneously with an extension of at least one of the first end-effector, the second end-effector, the third end-effector, or the fourth end-effector to the respective substrate workstation.

20. A non-transitory program storage device readable by a machine, tangibly embodying a program of instructions executable by the machine for performing operations, the operations comprising:
 placing a first substrate on a first substrate holding area of a first end-effector, placing a second substrate on a second substrate holding area of a second end-effector, placing a third substrate on a third substrate holding area of a third end-effector, and placing a fourth substrate on a fourth substrate holding area of a fourth end effector, wherein the first end-effector, the second end-effector, the third end-effector, and the fourth end-effector form a portion of a movable arm assembly comprising a pivoting base connected to a drive, wherein the movable arm assembly further comprises, a pivoting base connected to the drive, a first linkage connected to the pivoting base, the first linkage comprising, a first upper link coupled to the pivoting base through a first rotary joint, the first upper link comprising the first end-effector having at least the first substrate holding area, and a first lower link coupled to the pivoting base through a second rotary joint, the first lower link comprising the second end-effector having at least the second substrate holding area, wherein the first rotary joint is substantially coaxial with the second rotary joint, and a second linkage connected to the pivoting base, the second linkage comprising, a second upper link coupled to the pivoting base through a third rotary joint, the second upper link comprising the third end-effector having at least the third substrate holding area, and a second lower link coupled to the pivoting base through a fourth rotary joint, the second lower link comprising the fourth end-effector having at least the fourth substrate holding area, wherein the third rotary joint is substantially coaxial with the fourth rotary joint; and
 controlling a movement of the platform on the stationary base along a motion path in two opposing directions and moving the drive and the movable arm assembly to cause independent and simultaneous movement and transfer of substrates from at least one of the first substrate holding area, the second substrate holding area, the third substrate holding area, or the fourth substrate holding area into a respective substrate workstation; and
 controlling a movement of the movable arm assembly using at least one motor located in at least one of the pivoting base, the first linkage, or the second linkage.

* * * * *